US008755606B2

(12) United States Patent
Yates et al.

(10) Patent No.: US 8,755,606 B2
(45) Date of Patent: Jun. 17, 2014

(54) SYSTEMS AND METHODS FOR EFFICIENT FEATURE EXTRACTION ACCURACY USING IMPERFECT EXTRACTORS

(75) Inventors: J. Harlan Yates, Melbourne, FL (US); Mark Rahmes, Melbourne, FL (US); Michael McGonagle, Melbourne, FL (US); Timothy B. Faulkner, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 197 days.

(21) Appl. No.: 13/327,952

(22) Filed: Dec. 16, 2011

(65) Prior Publication Data
US 2013/0156323 A1    Jun. 20, 2013

(51) Int. Cl.
*G06K 9/46* (2006.01)

(52) U.S. Cl.
USPC ........... 382/195; 382/192; 382/224; 715/225; 715/238; 715/765; 715/788

(58) Field of Classification Search
None
See application file for complete search history.

(56) References Cited

U.S. PATENT DOCUMENTS

| | | | |
|---|---|---|---|
| 6,476,829 B1 | 11/2002 | Smith et al. | |
| 6,720,965 B1 | 4/2004 | Hirosawa et al. | |
| 6,970,183 B1 | 11/2005 | Monroe | |
| 7,555,725 B2 | 6/2009 | Abramson et al. | |
| 8,341,548 B2 | 12/2012 | Ernst et al. | |
| 8,484,223 B2 | 7/2013 | Ota | |
| 2002/0033837 A1 | 3/2002 | Munro | |
| 2004/0218099 A1 | 11/2004 | Washington | |
| 2005/0025357 A1 | 2/2005 | Landwehr et al. | |
| 2005/0047656 A1 | 3/2005 | Luo et al. | |
| 2005/0075544 A1 | 4/2005 | Shapiro et al. | |
| 2005/0094898 A1 | 5/2005 | Xu et al. | |
| 2005/0249434 A1 | 11/2005 | Xu et al. | |
| 2005/0289109 A1 | 12/2005 | Arrouye et al. | |
| 2006/0156254 A1 | 7/2006 | Satake | |
| 2006/0200760 A1 | 9/2006 | Sellers et al. | |
| 2006/0222205 A1 | 10/2006 | Porikli et al. | |
| 2007/0092110 A1 | 4/2007 | Xu et al. | |
| 2008/0147366 A1 | 6/2008 | Schutz et al. | |
| 2009/0076963 A1 | 3/2009 | Worthington | |
| 2009/0138817 A1 | 5/2009 | Oron et al. | |

(Continued)

OTHER PUBLICATIONS

Changing the way your search results look—eBay, Oct. 1, 2009.

(Continued)

*Primary Examiner* — Jason M Repko
*Assistant Examiner* — David Perlman
(74) *Attorney, Agent, or Firm* — Fox Rothschild, LLP; Robert J. Sacco

(57) ABSTRACT

Systems (100) and methods (300) for efficient feature data analysis. The methods involve: determining a first number of screen pages needed to verify that each of a plurality of clusters of detected features comprises only detected features which were correctly identified during feature extraction/detection operations as being of the same feature class as a selected feature of an image; determining a second number of screen pages needed to verify that each of a plurality of singular detected features was correctly identified during the feature extraction/detection operations as being of the same feature class as the selected feature of the image; selecting one of a plurality of different validation processes based on values of the first number of screen pages and the second number of screen pages; and performing the selected validation process to verify that each of the detected features does not constitute a false positive.

24 Claims, 26 Drawing Sheets

(56) References Cited

U.S. PATENT DOCUMENTS

| | | |
|---|---|---|
| 2009/0214084 A1 | 8/2009 | Asner |
| 2009/0241043 A9 | 9/2009 | Balthaser |
| 2010/0021012 A1 | 1/2010 | Seegers et al. |
| 2010/0070523 A1 | 3/2010 | Delgo et al. |
| 2010/0092045 A1 | 4/2010 | Zimmer et al. |
| 2010/0098342 A1 | 4/2010 | Davis et al. |
| 2010/0100835 A1 | 4/2010 | Klaric et al. |
| 2010/0111411 A1 | 5/2010 | Ernst et al. |
| 2010/0306665 A1 | 12/2010 | Milic-Frayling et al. |
| 2011/0173576 A1 | 7/2011 | Murphy et al. |
| 2011/0235858 A1 | 9/2011 | Hanson et al. |
| 2012/0039541 A1* | 2/2012 | Fukui et al. .......... 382/224 |
| 2012/0254804 A1 | 10/2012 | Sheha et al. |
| 2012/0316782 A1 | 12/2012 | Sartipi et al. |
| 2013/0120438 A1 | 5/2013 | Shechtman et al. |
| 2013/0124951 A1 | 5/2013 | Shechtman et al. |

OTHER PUBLICATIONS

Deng, J. et al, what does classifying more than 10,000 image categories tell us? Proceedings of the 12th European Conference of Computer Vision (ECCV). 2010. BibTex.

Russakovsky, O., et al, Attribute Learning in Large-scale Datasets. Proceedings of the 12th European Conference of Computer Vision (ECCV), 1st International Workshop on Parts and Attributes. 2010.

Deng, J., et al, ImageNet: A Large-scale Hierarchical Image Database. IEEE Computer Vision and Pattern Recognition (CVPR), 2009.

Deng, J., et al, Construction and Analysis of a Large Scale Image Ontology. In Vision Sciences Society (VSS), 2009.

Information about Related Patents and Patent Aplications, see section 6 of the accompanying Information Disclosure Statement Letter, which concerns Related Patents and Patent Applications.

* cited by examiner

From FIG. 21A

| (a) Receive a user input indicating that the chip images of the first page comprise a 'mixture' of features where some are erroneously identified and some are correctly identified as features of the same feature class as the user-selected feature, and/or (b) optionally permit user input to directly flag, unflag, or flag/unflag forward and backward from a specified chip image on the displayed screen page    2115 |

| Automatically mark every unmarked chip image on this page as "mixture" and validated, and/or automatically mark every unmarked chip image located between screen pages marked as "mixture"    2117 |

| Display a second screen page of sorted chip images which precedes or succeeds the first screen page by a certain amount in a plug-in window (e.g., halfway through the remaining unmarked pages in the direction of highest amount of unmarked pages)    2119 |

( End or perform other processing 2121 )

FIG. 21B

From FIG. 21A

| (a) Go to step 2109 until all chip images are marked, and/or (b) optionally go back to step 346 of FIG. 3B to further refine the assessment of unmarked or "mixture" image chips using a different certainty metric    2118 |

| Export all of the marked or annotated chip images automatically or in response to a user input    2122 |

( End or perform other processing 2124 )

FIG. 21C

SYSTEMS AND METHODS FOR EFFICIENT FEATURE EXTRACTION ACCURACY USING IMPERFECT EXTRACTORS

BACKGROUND OF THE INVENTION

1. Statement of the Technical Field

The invention concerns computing systems. More particularly, the invention concerns computing systems and methods for efficient feature extraction accuracy using imperfect extractors.

2. Description of the Related Art

There are many known imagery systems that collect and maintain spatial data. Such imagery systems include satellite based systems which collect imagery data covering particular areas of the Earth. The imagery data is typically analyzed for a variety of reasons, such as for surveillance purposes, quality control purposes and/or change detection purposes. The analysis often involves manually analyzing the imagery data over an area of interest. Such manual analysis is often achieved using a computer executing image analysis software (e.g., ESRI® ArcMap® geospatial information system software, SOCET SET® software, FALCONVIEW® software, ADOBE® PHOTOSHOP® software, computer aided design software, and computer aided manufacturing software). In this scenario, only a portion of a high resolution image is displayed to an operator at any given time. As such, the software provides a pan function and a zoom function. The pan function allows the operator to change a viewport from one part of an image to another part of the image. The zoom function allows the operator to change from a distant view of an image to a more close-up view (zoom in) of the image, and vice versa (zoom out). The pan and zoom operations are typically enabled by the operator using a computer mouse, joy stick and/or gestures.

During the image analysis process, the operator manually inspects the area of interest by: (a) obtaining feature data specifying locations and characteristics of a plurality of objects (e.g., gas stations); (b) "panning" to an area of interest within an image that is supposed to include a visual representation of at least one of the objects; (c) "zooming in" to obtain a close-up view of the area of interest; (d) visually comparing the current image to the feature data to determine if the object is still present in the area of interest and/or has the characteristics defined by the feature data; and (e) repeating steps (a)-(d) for each of the objects identified by the feature data. Notably, one or more "panning" and/or "zooming" operations may need to be performed to obtain a desired view of the area of interest. Such a manual inspection is time consuming, costly and subject to human error.

SUMMARY OF THE INVENTION

Embodiments of the present invention concern implementing systems and methods for efficient feature data analysis. The methods generally involve: determining a first number of screen pages needed to verify that each of a plurality of clusters of detected features comprises only detected features which were correctly identified during feature extraction/detection operations as being of the same feature class as a selected feature of an image; determining a second number of screen pages needed to verify that each of a plurality of singular detected features were correctly identified during feature extraction/detection operations as being of the same feature class as the selected feature of the image; selecting one of a plurality of different validation processes based on values of the first number of screen pages and the second number of screen pages; and performing the selected validation process to verify that each of the detected features was correctly identified as being of the same feature class as the selected feature of the image.

BRIEF DESCRIPTION OF THE DRAWINGS

Embodiments will be described with reference to the following drawing figures, in which like numerals represent like items throughout the figures, and in which:

FIGS. 21A-21C collectively provide a flow diagram of an exemplary convergent grid-parallel feature data analysis process that is useful for understanding the present invention.

DETAILED DESCRIPTION

Figure 1:
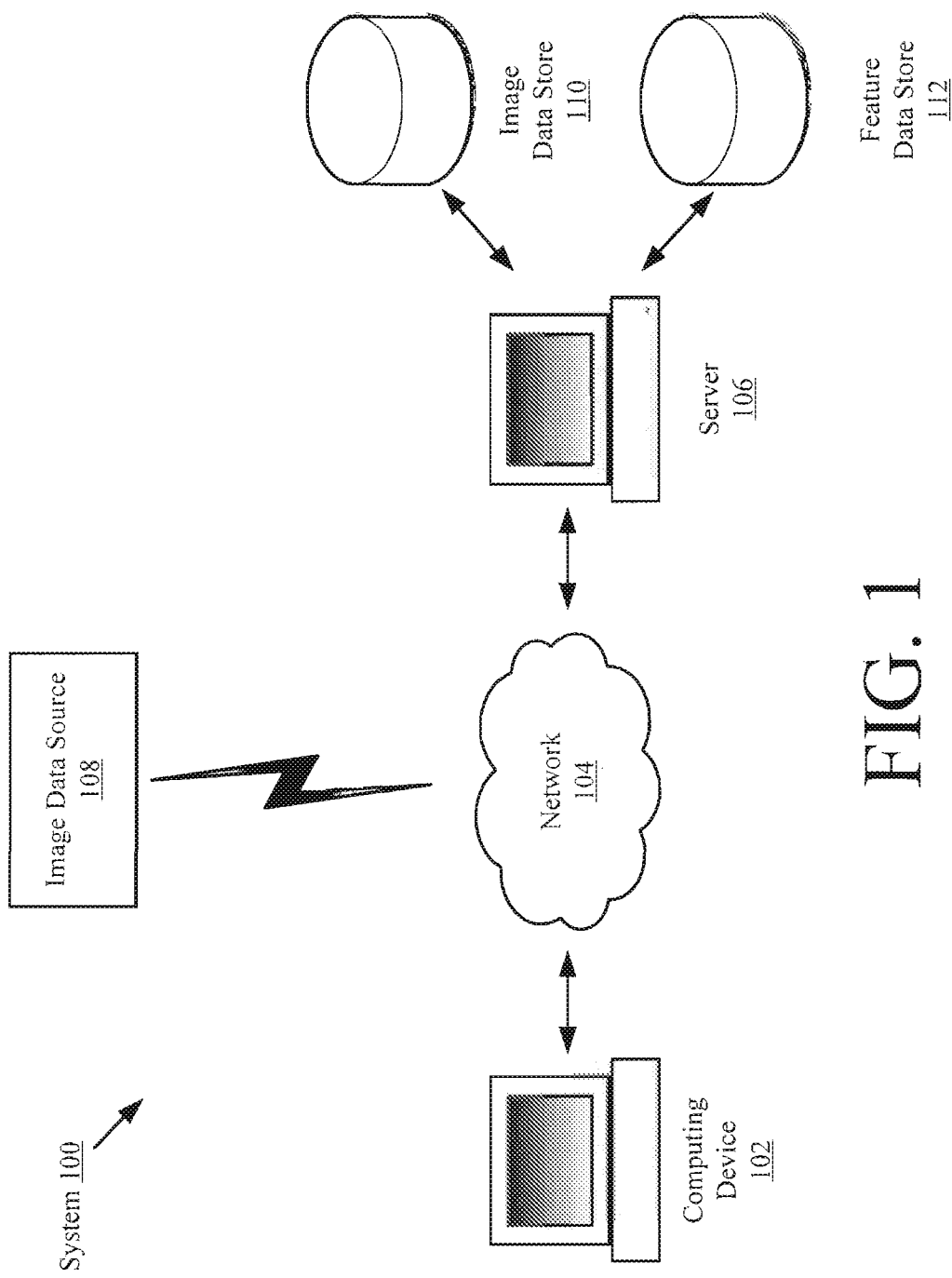
FIG. 1 is a schematic illustration of an exemplary system that is useful for understanding the present invention.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

The present invention concerns implementing systems and methods for efficient feature data analysis. In this regard, the present invention implements novel feature detection/extraction operations, data driven pan operations, data driven zoom operations, and parallel pan/zoom operations for facilitating the simultaneous visual inspection of numerous areas of interest of an image. The listed operations will become more evident as the discussion progresses. Still, it should be understood that the present invention overcomes various drawbacks of conventional feature data analysis techniques, such as those described above in the background section of this document. For example, the present invention provides more efficient, less time consuming and less costly data analysis processes as compared to those of conventional data analysis techniques.

In general, the objective of the present invention is to facilitate an efficient feature data analysis. This objective is at least partially achieved by enabling the review of a minimal number of full screen pages of automated feature detection/extraction results ("automated results"). Prior to performing a review process, it is determined what cases of automated results give the least number of screen pages to review. For example, at least two cases are considered when feature data for the automated results is available. In a first one of these cases, the automated results comprise "n" (e.g., four) clusters of "detected features". In this scenario, the total number of full screen pages needed to review the automated results is "n" (e.g., one screen page for each of the four clusters of "detected features"). In a second one of these cases, the automated results comprise "m" (e.g., twenty-five) "detected features". A grid size is "$c_1$" cells by "$c_2$" cells (e.g., ten cells by ten cells). As such, the total number of full screen pages needed to review the automated results is "m" divided by "$c_1$ times $c_2$" (e.g., one full screen page determined by dividing twenty-five by one hundred). Based on the results of the case analyses, a cluster based validation process or a grid-parallel based validation process is performed for reviewing the automated results using the minimal number of full screen pages. In some embodiments, the automated results are reviewed to verify that are true positives or not false positives. A true positive is a feature which was correctly identified during feature detection/extraction operations as being of the same feature class as a user-selected feature of an image. A false positive is a feature that was incorrectly or erroneously identified during a feature detection/extraction process as being a feature of the same feature class as a user-selected feature of an image. Various cluster based validation processes and grid-parallel based validation processes are described in detail below.

The present invention can be used in a variety of applications. Such applications include, but are not limited to, imagery applications, sensor applications, mapping applications, biometric applications (e.g., fingerprint applications), video applications, geospatial information based applications, medical applications, military applications, photograph applications, graphing applications, charting applications and any other application in which feature data needs to be analyzed. Exemplary implementing system embodiments of the present invention will be described below in relation to FIGS. 1, 2, 5, 7 and 8A-8B. Exemplary method embodiments of the present invention will be described below in relation to FIGS. 3A-30.

Exemplary Systems Implementing the Present Invention

Referring now to FIG. 1, there is provided a block diagram of an exemplary system 100 that is useful for understanding the present invention. The system 100 comprises a computing device 102, a network 104, a server 106, an image data source 108, and at least one data store 110, 112. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to facilitate feature data maintenance using imagery source for feature display, quality control, and change detection. As such, system 100 implements a method for efficient feature data analysis in accordance with embodiments of the present invention. The method will be described in detail below in relation to FIGS. 3A-30. However, it should be understood that the method implements (a) a novel technique for feature detection/extraction, and (b) a data driven approach for enabling an efficient evaluation of geospatial data using imagery data. The phrase "imagery data", as used herein, refers to data defining an image. The image includes, but is not limited to, a two-dimensional representation of at least one object and/or a two-dimensional representation of the spatial distributions of at least one phenomenon. For example, the image is a hand drawn map, a topographical map, a graph, a photograph, a nautical chart, a drawing, a painting, or a computer graphic.

The geospatial data and imagery data can be stored in the same or different data stores. For example, as shown in FIG. 1, the geospatial data is stored in a feature data store 112 and the imagery data is stored in an image data store 110. The imagery data may be any type of imagery data. The imagery data can include, but is not limited to, any spatially organized raster data or similar data (e.g., satellite imagery data, airborne imagery data, digitally rendered map data, gridded terrain data, Light Detection And Ranging ("LIDAR") data, Synthetic Aperture Radar ("SAR") data, and/or scanned data). The imagery data is collected by image data source 108. The image data source can include, but is not limited to, a satellite, an Unmanned Aerial Vehicle ("UAV"), a plane and a vehicle. Also, the imagery data can be communicated to the data store 110 via network 104 and server 106.

The computing device 102 facilitates feature data analysis. Accordingly, the computing device 102 has installed thereon an Image/Feature Analysis ("IFA") software application and at least one feature analysis plug-in. The IFA software application includes, but is not limited to, ESRI® ArcMap® Geospatial Information System ("GIS") software, SOCET SET® software, FALCONVIEW® software, ADOBE® PHOTOSHOP® software, Computer Aided Design ("CAD") software, and/or Computer Aided Manufacturing ("CAM") software. Each of the listed IFA software applications is well known in the art, and therefore will not be described in detail herein. However, it should be understood that the IFA software applications facilitate the display of images in an application window. The IFA software applications also facilitate the panning and zooming of the displayed images.

The feature analysis plug-in is a set of software components that adds specific abilities to the IFA software application. For example, the feature analysis plug-in provides the ability to: concurrently and/or simultaneously generate a plurality of chip images using imagery data defining an image; and display all or a portion of the generated chip images in a display area of a plug-in window at the same time. The phrase "chip image", as used herein, refers to a panned and/or zoomed view of an image. A chip image may include one or more features of interest. The term "feature", as used herein, refers to a representation of an object. Such objects include, but are not limited to, bridges, water towers, boats, planes, roads, lakes, buildings, gas stations, restaurants, malls, stores, vehicles, and cisterns. Notably, the chip images may be displayed in the plug-in window in a grid format or a matrix format. In the grid scenario, each cell of a grid includes one chip image. As a result of such a grid arrangement of chip images, a user can perform data analysis in a shorter period of time as compared to that needed to perform a data analysis using the conventional technique employed by the IFA software application. This conventional technique generally involves manually panning and zooming to each instance of a feature class.

Figure 2:
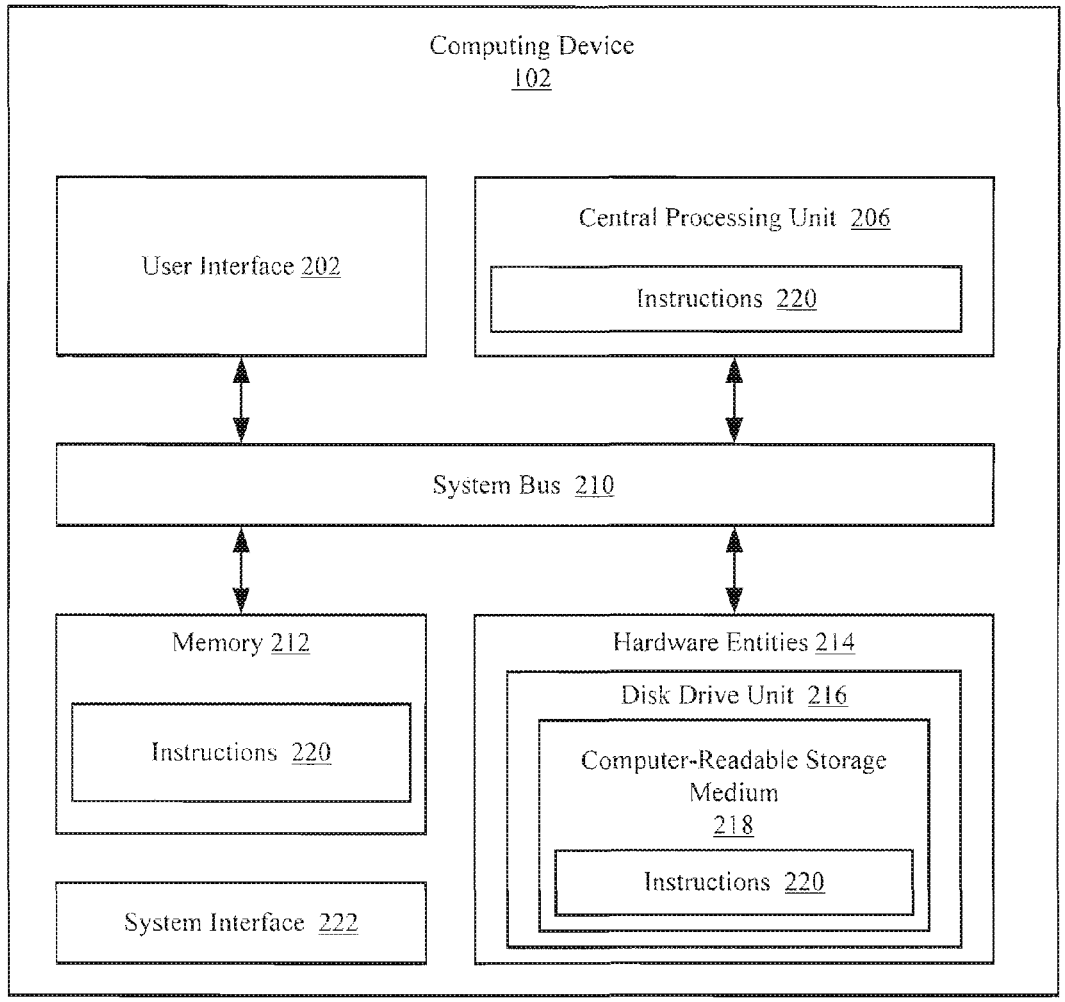
FIG. 2 is a block diagram of an exemplary computing device that is useful for understanding the present invention.

Referring now to FIG. 2, there is provided a block diagram of an exemplary embodiment of the computing device 102. The computing device 102 can include, but is not limited to, a notebook, a desktop computer, a laptop computer, a personal digital assistant, and a tablet PC. The server 106 of FIG. 1 can be the same as or similar to computing device 102. As such, the following discussion of computing device 102 is sufficient for understanding server 106 of FIG. 1. Notably, some or all the components of the computing device 102 can be implemented as hardware, software and/or a combination of hardware and software. The hardware includes, but is not limited to, one or more electronic circuits.

Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device configured to facilitate feature data analysis in an efficient manner. As such, the computing device 102 of FIG. 2 implements improved methods for feature data analysis in accordance with embodiments of the present invention.

As shown in FIG. 2, the computing device 102 includes a system interface 222, a user interface 202, a Central Processing Unit ("CPU") 206, a system bus 210, a memory 212 connected to and accessible by other portions of computing device 102 through system bus 210, and hardware entities 214 connected to system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 102 to communicate directly or indirectly with external communication devices (e.g., server 106 of FIG. 1). If the computing device 102 is communicating indirectly with the external communication device, then the computing device 102 is sending and receiving communications through a common network (e.g., the network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220.

The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some embodiments of the present invention, the hardware entities 214 include an electronic circuit (e.g., a processor) programmed for facilitating efficient feature data analysis through data-driven spatial sampling and data-driven spatial re-expansion of imagery data. In this regard, it should be understood that the electronic circuit can access and run IFA software applications (not shown in FIG. 2), feature analysis plug-ins (not shown in FIG. 2) and other types of applications installed on the computing device 102. The IFA software applications are generally operative to facilitate the display of images in an application window, the panning of displayed images, and the zooming of displayed images. The listed functions and other functions implemented by the IFA software applications are well known in the art, and therefore will not be described in detail herein. A schematic illustration of an exemplary application window 504 is provided in FIG. 5.

The feature analysis plug-ins are generally operative to display a plug-in window on a display screen of the computing device 102. A schematic illustration of an exemplary plug-in window 702 is provided in FIG. 7. Various types of information can be presented in the plug-in window. Such information includes, but is not limited to, chip images and feature attributes. The feature attributes can include, but are not limited to, certainty values, heights, lengths, diameters, longitudes, latitudes, addresses, names, text and sales volumes.

The feature analysis plug-ins are also operative to perform various feature detection operations. The feature detection operations include, but are not limited to, operations for: obtaining feature information identifying portions of an image that may constitute features of the same feature class as a user-selected feature; obtaining certainty values reflecting the levels of confidence that respective identified portions of an image actually constitute features of the same feature class as a user-selected feature; comparing certainty values to one or more threshold values; discarding feature information associated with certainty values which do not exceed one or more threshold values; processing feature information to identify one or more clusters of features; determining if a total number of identified clusters of features is less than a total number of features detected divided by a parallelization factor; determining if a total number of clusters of features is less than log base two of the total number of features detected divided by a parallelization factor; enabling clustered feature data analysis processes; enabling convergent grid-parallel feature data analysis processes; and enabling grid-parallel feature data analysis processes. The phrase "parallelization factor", as used herein, refers to a number defined by a pre-defined grid size for a grid of chip images. For example, if a grid has a size of ten cells by ten cells, then the parallelization factor is one hundred (i.e., the result of multiplying ten by ten). Similarly, if a grid has a size of three cells by three cells, then the parallelization factor is nine (i.e., the result of multiplying three by three). Exemplary clustered feature data analysis processes will be described below in relation to FIGS. 10-16. Exemplary convergent grid-parallel feature data analysis processes will be described below in relation to FIGS. 21-24. Exemplary grid-parallel feature data analysis processes will be described below in relation to FIGS. 17-20 and 25-29.

Notably, the feature information is generated using one or more feature detection/extraction algorithms. The feature detection/extraction algorithms include, but are not limited to, edge detection based algorithms, corner detection based algorithms, blob detection based algorithms, ridge detection based algorithms, and Hough transform based algorithms. Each of the listed feature detection/extraction algorithms is well known in the art, and therefore will not be described herein. The certainty values are computed using one or more certainty calculation algorithms. Certainty calculation algorithms are well known in the art, and therefore will not be described herein.

The feature analysis plug-in are further operative to perform one or more of: automatically and simultaneously generate a plurality of chip images in response to a user software interaction; generate at least one screen page of chip images arranged in a grid or matrix format; display screen pages of chip images in a plug-in window; update a view of an image displayed in an application window to show at least the visual contents of a selected one of a plurality of chip images displayed in a plug-in window; sort a plurality of chip images based on at least one feature attribute (e.g., certainty value); generate and display at least one screen page of chip images which are arranged in a sorted order; filter chip images based on at least one feature attribute (e.g., certainty value); randomly select and display only a percentage of a plurality of chip images; change a grid size in response to a user software interaction; change a zoom level of scale or resolution of displayed chip images in response to a user software interaction; pan an image displayed in an application window such that a feature of a chip image displayed in a plug-in window is shown in the application window; zoom an image displayed in an application window such that a feature of a chip image is shown at a particular zoom resolution within the application window; cycle through screen pages of chip images that were generated using a plurality of images; generate and display chip images comprising visual representations of features that are common to two or more images; mark chip images in response to user software interactions; unmark chip images in response to user software interactions; and remember various settings that a user sets for each feature class (e.g., bridges, water towers and gas stations) during at least one session. The listed functions and other functions of the feature analysis plug-ins will become more apparent as the discussion progresses. Notably, one or more of the functions of the feature analysis plug-ins can be accessed via a toolbar, menus and other Graphical User Interface ("GUI") elements of the plug-in window.

A schematic illustration of an exemplary toolbar 704 of a plug-in window (e.g., plug-in window 702 of FIG. 7) is provided in FIG. 8A. As shown in FIG. 8A, the toolbar 704 comprises a plurality of exemplary GUI widgets 802-828. Each of the GUI widgets 802-828 is shown in FIG. 8A as a particular type of GUI widget. For example, GUI widget 802 is shown as a drop down menu. Embodiments of the present invention are not limited in this regard. The GUI widgets 802-828 can be of any type selected in accordance with a particular application.

GUI widget 802 is provided to facilitate the display of an array of chip images providing visual representations of features of a user selected feature class (e.g., chimney/smokestack, gas station, restaurant, lake, road, water tower, and building). The array of chip images is displayed in the display area (e.g., display area 706 of FIG. 7) of the plug-in window (e.g., plug-in window 702 of FIG. 7) in a grid format. In the embodiment shown in FIG. 8A, the GUI widget 802 includes, but is not limited to, a drop down list that is populated with the feature classes identified in a previously generated feature list. Drop down lists are well known in the art, and therefore will not be described herein.

GUI widget 804 is provided to facilitate moving through screen pages of chip images associated with a single feature class. If a selected feature class has more than the maximum number of features that can fit in a grid of a selected grid size (e.g., three cells by three cells), then the feature analysis plug-in generates a plurality of screen pages of chip images. Each screen page of chip images includes a grid with chip images contained in the cells thereof. As shown in the embodiment of FIG. 8A, the GUI widget 804 includes, but is not limited to, a text box, a forward arrow button and a backward arrow button. Text boxes and arrow buttons are well known in the art, and therefore will not be described herein. This configuration of the GUI widget 804 allows a user to move forward and backward through the screen pages of chip images associated with a single image. Paging forward or backward will cause the chip image in an upper left corner grid cell of the new screen page to be selected. The screen page context is displayed in the text box as the numerical range of chip images displayed (e.g., chip images one through nine) and the total number of chip images (e.g., twenty) providing visual representations of features of a selected feature class.

GUI widget 806 is provided to facilitate jumping to a desired screen page of chip images for review. As shown in the embodiment of FIG. 8A, GUI widget 806 includes, but is not limited to, a text box and a search button. The text box is a box in which to enter a screen page number (e.g., three). Clicking the search button will cause the screen page of chip images having the entered screen page number to be displayed in the display area (e.g., display area 706 of FIG. 7) of the plug-in window (e.g., plug-in window 702 of FIG. 7).

GUI widget 808 is provided to facilitate a selection of a grid size from a plurality of pre-defined grid sizes. As shown in FIG. 8A, the GUI widget 808 includes, but is not limited to, a drop down list listing a plurality of pre-defined grid sizes. In some embodiments, the pre-defined grid sizes include one cell by one cell, two cells by two cells, three cells by three cells, four cells by four cells, five cells by five cells, six cells by six cells, seven cells by seven cells, eight cells by eight cells, nine cells by nine cells, and ten cells by ten cells. The grid size of two cells by two cells ensures that a maximum of four chip images will be simultaneously or concurrently displayed in the display area of the plug-in window. The grid size of three cells by three cells ensures that a maximum of nine chip images will be simultaneously or concurrently displayed in the display area of the plug-in window. The grid size of four cells by four cells ensures that a maximum of sixteen chip images will be simultaneously or concurrently displayed in the display area of the plug-in window. The grid size of five cells by five cells ensures that a maximum of twenty-five chip images will be simultaneously or concurrently displayed in the display area of the plug-in window. The grid size of six cells by six cells ensures that a maximum of thirty-six chip images will be simultaneously or concurrently displayed in the display area of the plug-in window. The grid size of seven cells by seven cells ensures that a maximum of forty-nine chip images will be simultaneously or concurrently displayed in the display area of the plug-in window. The grid size of eight cells by eight cells ensures that a maximum of sixty-four chip images will be simultaneously or concurrently displayed in the display area of the plug-in window. The grid size of nine cells by nine cells ensures that a maximum of eight-one chip images will be simultaneously or concurrently displayed in the display area of the plug-in window. The grid size of ten cells by ten cells ensures that a maximum of one hundred chip images will be simultaneously or concurrently displayed in the display area of the plug-in window. Embodiments of the present invention are not limited in this regard. A grid size can alternatively be selected to define a grid having more or less rows than columns. For example, the grid size can be selected to be three cells by four cells.

Notably, the display area for each chip image is different for each grid size. For example, the display area for each chip image in a grid having a grid size of two cells by two cells is larger than the display area for each chip image in a grid having a grid size of three cells by three cells. Also, if each chip image has the same zoom level of scale or resolution, then the portion of an image contained in a chip image displayed in a two cell by two cell grid is larger than the portion of an image contained in a chip image displayed in a three cell by three cell grid. It should also be noted that, in some embodiments, a selected chip image of a first grid will reside in an upper left corner cell of a second grid having an enlarged or reduced grid size.

GUI widget 812 is provided to facilitate a selection of features for display in the display area (e.g., display area 706 of FIG. 7) of the plug-in window (e.g., plug-in window 702 of FIG. 7) based on their attributes (e.g., certainty values or other feature detection/extraction metric). As shown in FIG. 8A, the GUI widget 812 includes a "filter control" button and a "filter setting" drop down button. The "filter control" button facilitates the enablement and disablement of an attribute filter function of the feature analysis plug-in. The "filter setting" drop down button facilitates the display of a drop-down box for assembling a query phrase defining an attribute filter (e.g., ["HEIGHT"='100 Feet'], ["HEIGHT"<'100 Feet'], ["HEIGHT"< >'100 Feet'], ["HEIGHT" IS NULL], ["HEIGHT" IS NOT NULL], ["HEIGHT">'100 Feet' AND "DIAMETER">'40 Feet'], or ["HEIGHT"<'100 Feet' OR "DIAMETER">'40 Feet']). A schematic illustration of an exemplary drop-down box 850 is provided in FIG. 8B. When the attribute filter function is enabled, the query phrase takes effect immediately.

Notably, the feature analysis plug-in remembers the filter query phrase that a user sets for each feature class during a session. Accordingly, if the user changes a feature class from a first feature class (e.g., bridges) to a second feature class (e.g., water towers) during a session, then the previously set filter query for the second feature class will be restored. Consequently, only features of the second feature class (e.g., water towers) which have the attribute specified in the previously set filter query (e.g., "HEIGHT"='100 Feet') will be displayed in the plug-in window.

GUI widget 814 is provided to facilitate the sorting of chip images based on one or more attributes of the features shown therein. For example, a plurality of chip images are sorted into an ascending or descending order based on the certainty values associated with the features shown therein. As shown in FIG. 8A, the GUI widget 814 includes a drop down list. Embodiments of the present invention are not limited in this regard. For example, the GUI widget 814 can alternatively include a button and a drop down arrow for accessing a drop down box. The button facilitates the enablement and disablement of a sorting function of the feature analysis plug-in. The drop down box allows a user to define settings for sorting chip images based on one or more attributes of an active feature class. As such, the drop down box may include a list from which an attribute can be selected from a plurality of attributes. The drop down box may also include widgets for specifying whether the chip images should be sorted in an ascending order or a descending order.

Notably, the feature analysis plug-in remembers the sort settings that a user defines for each feature class during a session. Accordingly, if the user changes a feature class from a first feature class (e.g., bridges) to a second feature class (e.g., water towers) during a session, then the previously defined sort settings for the second feature class will be restored. Consequently, chip images showing features of the second feature class (e.g., water towers) will be displayed in a sorted order in accordance with the previously defined sort settings.

GUI widget 820 is provided to facilitate the display of a random sample of chip images of features of a particular feature class for visual inspection and quality control testing. As such, the GUI widget 820 includes, but is not limited to, a button for enabling/disabling a random sampling function of the feature analysis plug-in and a drop down menu from which a percentage value can be selected.

GUI widget 822 is provided to facilitate the filtering of features with center points which lie outside of an area (e.g., a geographical area) defined either by the area that a plurality of images have in common or by the area covered by a plurality of images taken together. As such, the GUI widget 822 includes, but is not limited to, a button for enabling and disabling an intersection function of the feature analysis plug-in.

GUI widget 810 is provided to facilitate the selection of an image from a plurality of images. As shown in FIG. 8A, the GUI widget 810 includes, but is not limited to, a text box and a drop down list populated with the names of images. If a user selects a new item from the drop down list, then the feature analysis plug-in generates and displays at least one screen page of chip images using the image identified by the newly selected item. The chip images contain visual representations of features of the same feature class as the immediately preceding displayed chip images. The text box displays information identifying the image from which the currently displayed chip images were generated. The contents of the text box can be updated in response to a user selection of a new item from the drop down list. The contents of the text box can also be updated by the feature analysis plug-in during the performance of image cycling operations, which will be described below in relation to GUI widget 824. Accordingly, the information contained in the text box always identifies the image from which the currently displayed chip images were generated.

GUI widget 824 is provided to facilitate the cycling through chip image screen pages for a plurality of images. A user may want to cycle through such chip image screen pages for change detection purposes. The GUI widget 824 is configured to allow manual cycling and/or automatic cycling between chip image screen pages for a plurality of images. As such, the GUI widget 824 includes, but is not limited to, a check box for enabling and disabling image cycling operations of the feature analysis plug-in, a slider for setting the rate at which the images automatically cycle, and/or a button for manually commanding when to change the image.

GUI widget 826 is provided to facilitate the performance of manual-scale operations by the feature analysis plug-in. The manual-scale operations are operative to adjust the zoom level of scale of all of the displayed chip images from a first zoom level of scale to a second zoom level of scale in response to a user-software interaction. The first zoom level of scale is a default zoom level of scale (e.g., 100%) or a previously user-selected zoom level of scale (e.g., 50%). The second zoom level of scale is a new user-selected zoom level of scale (e.g., 75%). As such, the GUI widget 826 includes, but is not limited to, a drop down list populated with a plurality of whole number percentage values. The percentage values include, but are not limited to, whole number values between zero and one hundred.

GUI widget 828 is provided to facilitate the viewing of each displayed feature at its best-fit zoom level of scale or its pre-defined maximum zoom level of scale. As such, the GUI widget 828 includes, but is not limited to, a button for enabling and disabling auto-scale operations of the feature analysis plug-in. When the auto-scale operations are enabled, the manual-scale operations are disabled. Similarly, when the auto-scale operations are disabled, the manual-scale operations are enabled.

GUI widget 830 is provided to facilitate the writing of all "flagged" chip images to an output file stored in a specified data store (e.g., feature data store 112 of FIG. 1). GUI widget 830 is provided to facilitate the saving of all chip images which have been "flagged" during a session to a user-named file. The user-named file can include, but is not limited to, a shapefile. Shapefiles are well known in the art, and therefore will not be described herein. In some embodiments of the present invention, a chip image is "flagged" by right clicking on the chip image to obtain access to a "chip context" GUI and selecting a "flag" item from the "chip context" GUI.

As evident from the above discussion, the system 100 implements one or more method embodiments of the present invention. The method embodiments of the present invention provide implementing systems with certain advantages over conventional data analysis systems. For example, the present invention provides a system in which an analysis of spatial data can be performed in a shorter period of time as compared to the amount of time needed to analyze spatial data using conventional pan/zoom techniques. The present invention also provides a system in which spatial data is analyzed much more efficiently than in conventional spatial data analysis systems. The manner in which the above listed advantages of the present invention are achieved will become more evident as the discussion progresses.

Exemplary Methods of the Present Invention

Referring now to FIGS. 3A-3E, there is provided a flow diagram of an exemplary method 300 for efficient feature data analysis that is useful for understanding the present invention. In general, the objective of method 300 is efficient feature extraction by reviewing the minimal number of full screen pages of automated feature detection/extraction results ("automated results"). Prior to performing a review process, it is determined what cases of automated results give the least number of screen pages to review. For example, at least two cases are considered when feature data for the automated results is available. In a first one of these cases, the automated results comprise "n" (e.g., four) clusters of "detected features". In this scenario, the total number of full screen pages needed to review the automated results is "n" (e.g., one screen for each of the four clusters of "detected features"). In a second one of these cases, the automated results comprises "m" (e.g., twenty-five) "detected features". A grid size is "$c_1$" cells by "$c_2$" cells (e.g., ten cells by ten cells). As such, the total number of full screen pages needed to review the automated results is "m" divided by "$c_1$ times $c_2$" (e.g., one full screen page determined by dividing twenty-five by one hundred). Based on the results of the case analyses, a cluster based validation process or a grid-parallel based validation process is performed for reviewing the automated results using the minimal number of full screen pages. In some embodiments, the automated results are reviewed to verify that are not false positives, i.e., that they were not erroneously identified during a feature detection/extraction process as being a feature of the same feature class as a user-selected feature of an image. Various cluster based validation processes and grid-parallel based validation processes are described in detail below. The above described objective of method 300 will become more evident as the discussion progresses.

Figure 3A:
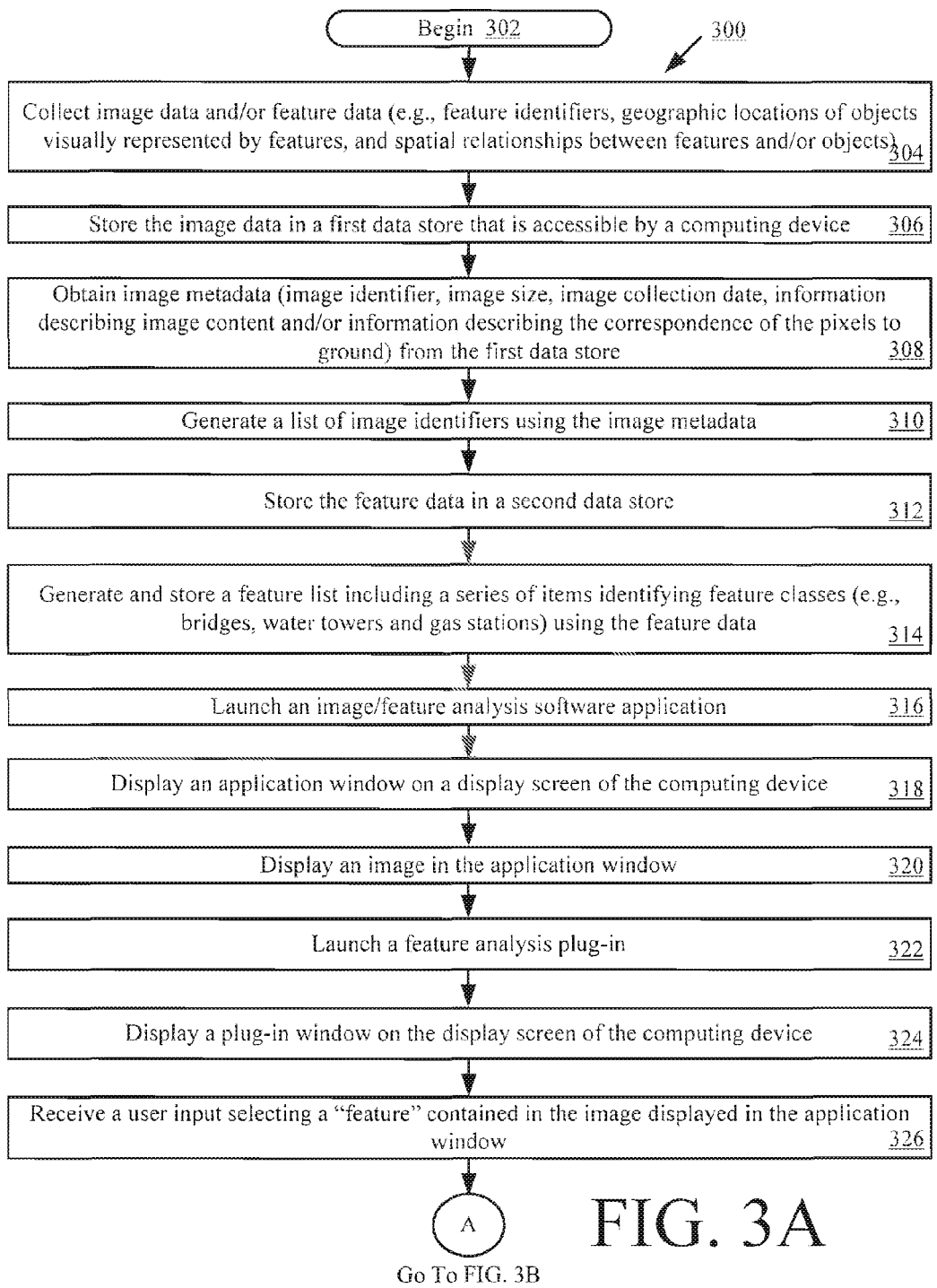
FIGS. 3A-3E collectively provide a flow diagram of an exemplary method for efficient feature data analysis that is useful for understanding the present invention.

As shown in FIG. 3A, the method 300 begins with step 302 and continues with steps 304-326. Although steps 304-326 are shown as being performed prior to the steps of FIG. 3B, embodiments of the present invention are not limited in this regard. For example, steps 304-326 can alternatively be performed immediately prior to the feature data analysis steps 354, 356 in FIG. 3C, feature data analysis steps 364, 368 of FIG. 3D and/or feature data analysis step 378 of FIG. 3E. In these scenarios, the feature detection/extraction operations of FIG. 3B may be performed separately and/or prior to the initialization of the feature analysis plug-in of step 322. In this scenario, step 328 is an alternative starting point for method 300.

Referring again to FIG. 3A, step 304 involves collecting image data and feature data is collected. The feature data can include, but is not limited to, data defining feature identifiers, geographic locations of objects visible in an image, and spatial relationships between features and/or objects. After the image data is collected, it is stored in a first data store (e.g., data store 110 of FIG. 1) that is accessible by a computing device (e.g., computing device 102 of FIG. 1), as shown by step 306. In a next step 308, image metadata is obtained from the first data store. The image metadata can include, but is not limited to, data defining image identifiers, image sizes, image collection dates, image content, and the correspondence of pixels to ground. The image metadata is then used in step 310 to generate a list of image identifiers. This list of image identifiers may be subsequently used by an IFA software application and/or a feature analysis plug-in to allow a user to select at least one of a plurality of images to analyze at any given time.

Similar to the image data, the feature data is stored in a data store (e.g., data store 112 of FIG. 1) after it is collected, as shown by step 312. The feature data is used in step 314 to generate a feature list including a series of items identifying feature classes (e.g., bridges, water towers and gas stations). Subsequently, the feature list is stored in the data store (e.g., data store 112 of FIG. 1).

Figure 4:
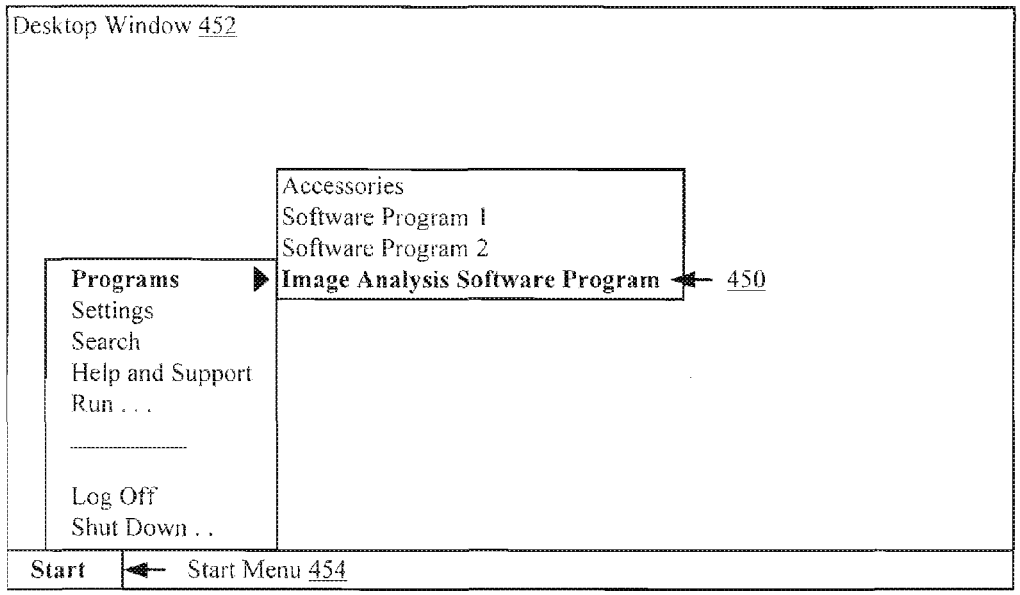
FIG. 4 is a schematic illustration of an exemplary desktop window that is useful for understanding the present invention.

Upon completing step 314, the method continues with step 316 where an IFA software application is launched. The IFA software application can be launched in response to a user software interaction. For example, as shown in FIG. 4, an IFA software application can be launched by accessing and selecting an IFA software application entry 450 on a start menu 454 of a desktop window 452.

Figure 5:
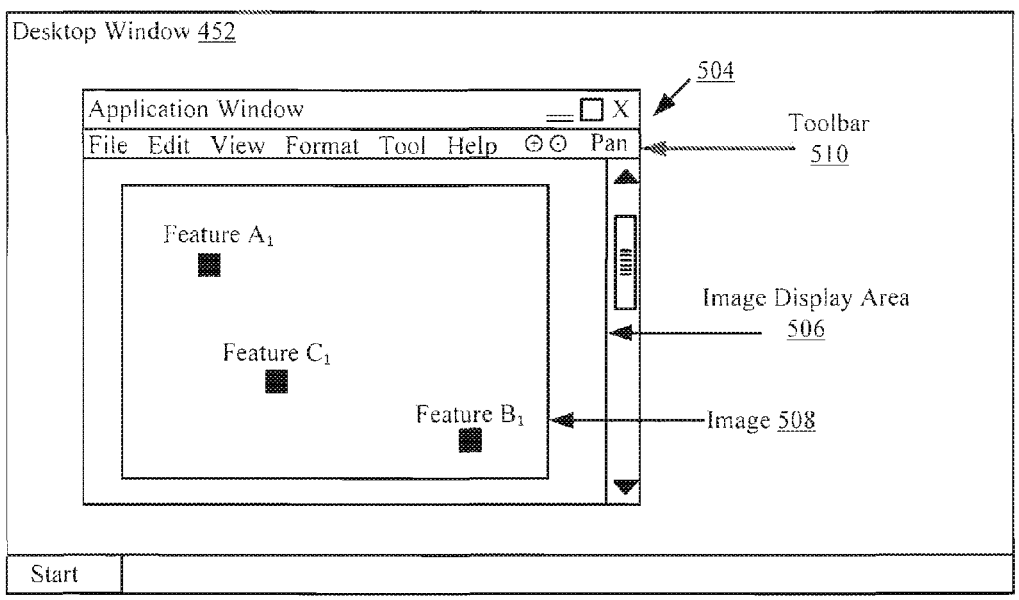
FIG. 5 is a schematic illustration of an exemplary application window that is useful for understanding the present invention.

In a next step 318, an application window is displayed on top of the desktop window. A schematic illustration of an exemplary application window is provided in FIG. 5. As shown in FIG. 5, the application window 504 includes a toolbar 510 including GUI widgets for at least displaying an image, panning an image, zooming an image, and launching a plug-in. The application window 504 also includes an image display area 506 in which an image can be presented to a user of the computing device (e.g., computing device 102 of FIG. 1).

Referring again to FIG. 3A, an image is displayed in the application window, as shown in step 320. A schematic illustration showing an exemplary image 508 displayed in an application window 504 is provided in FIG. 5. The image 508 contains a feature $A_1$ (e.g., a dot or polygon visually representing a water tower), a feature $B_1$ (e.g., a dot or polygon visually representing a bridge) and a feature $C_1$ (e.g., a dot or polygon visually representing a gas station). Each of the features may include, but is not limited to, a point, a line or a polygon providing a visual representation of an object (e.g., a water tower, a bridge or a gas station). Notably, the image can be selected by a user using a GUI widget of the application window. In this regard, the GUI widget can present the list of image identifiers generated in previous step 310 to a user of the computing device. The GUI widget can also allow the user to select an image identifier from the list of image identifiers. In response to the user-selection of an image identifier, the IA application software displays an image identified by the selected image identifier in the application window.

Figure 6:
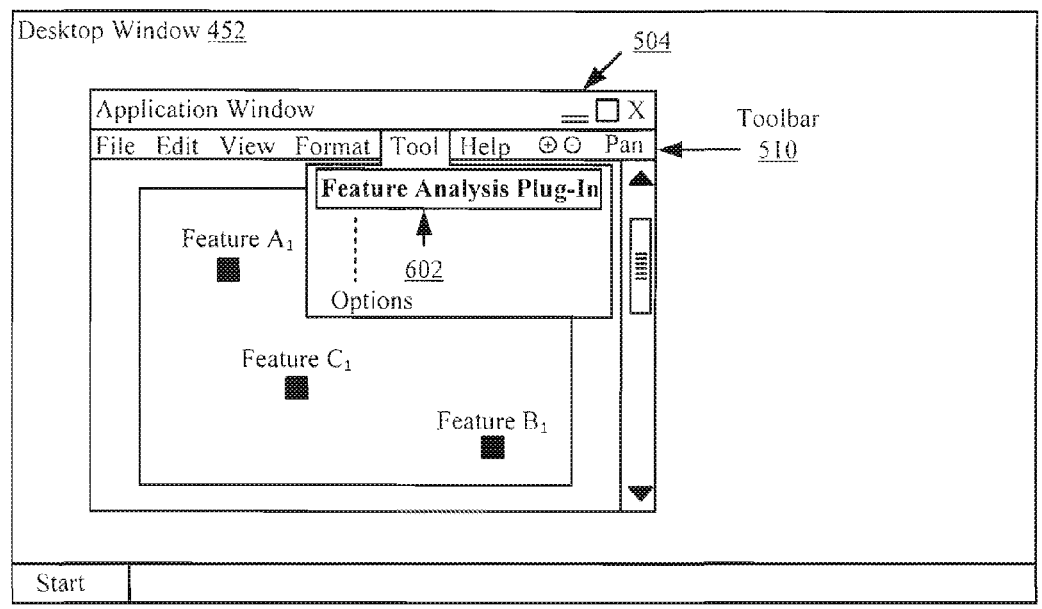
FIG. 6 is a schematic illustration of an exemplary application window that is useful for understanding the present invention.
Figure 7:
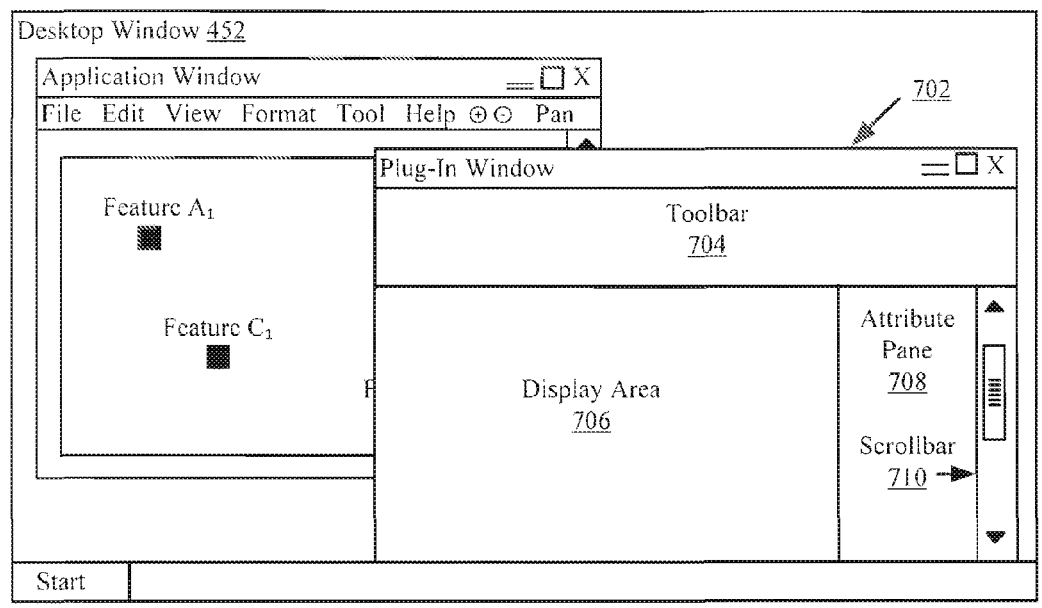
FIG. 7 is a schematic illustration of an exemplary plug-in window that is useful for understanding the present invention.
Figure 8:
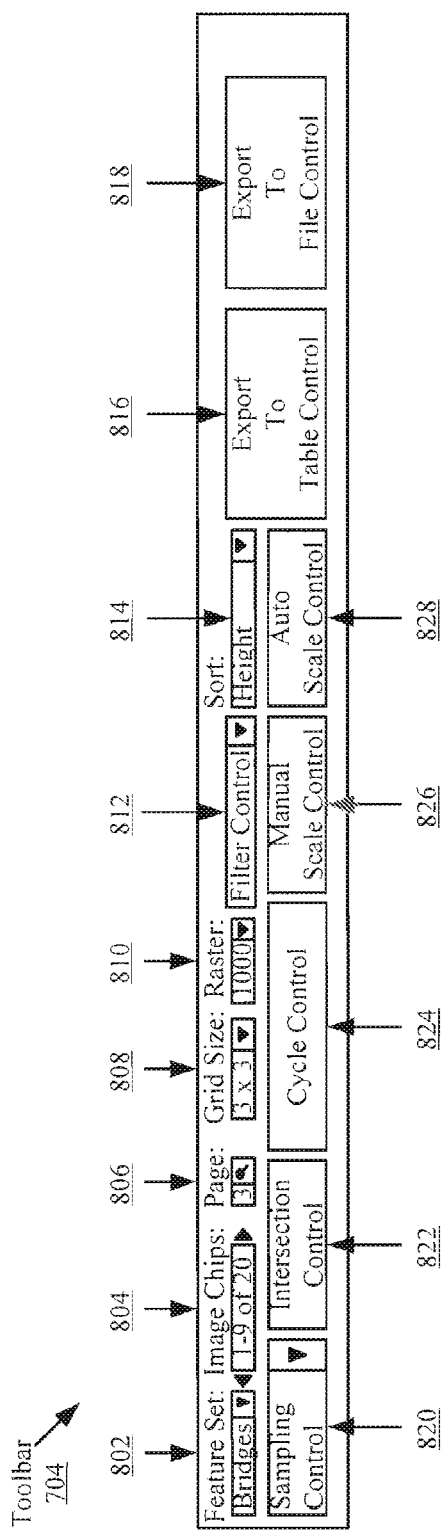
FIG. 8A is a schematic illustration of an exemplary toolbar of a plug-in window that is useful for understanding the present invention.
FIG. 8B is a schematic illustration of an exemplary drop down box that is useful for understanding the present invention.

After the image is presented to a user of the computing device (e.g., computing device 102 of FIG. 1), a feature analysis plug-in is launched, as shown by step 322. The feature analysis plug-in can be launched in response to a user-software interaction. For example, as shown in FIG. 6, a feature analysis plug-in is launched by selecting an item 602 of a drop down menu of a toolbar 510. Once the feature analysis plug-in is launched, step 324 is performed where a plug-in window is displayed on top of the desktop window and/or application window. A schematic illustration of an exemplary plug-in window 702 is provided in FIG. 7. As shown in FIG. 7, the plug-in window 702 comprises a toolbar 704, a display area 706, an attribute pane 708, and a scrollbar 710. The display area 706 provides an area where screen pages can be displayed. The attribute pane 708 provides an area where attribute information relating to a displayed feature or chip image can be visually presented. The scrollbar 710 allows a user to scroll continuous text representing the attribute information. A schematic illustration of the toolbar 704 is provided in FIG. 8A. As shown in FIG. 8A, the toolbar 704 comprises a plurality of exemplary GUI widgets 802-828. Each of the GUI widgets 802-828 is described above in detail.

Figure 9:
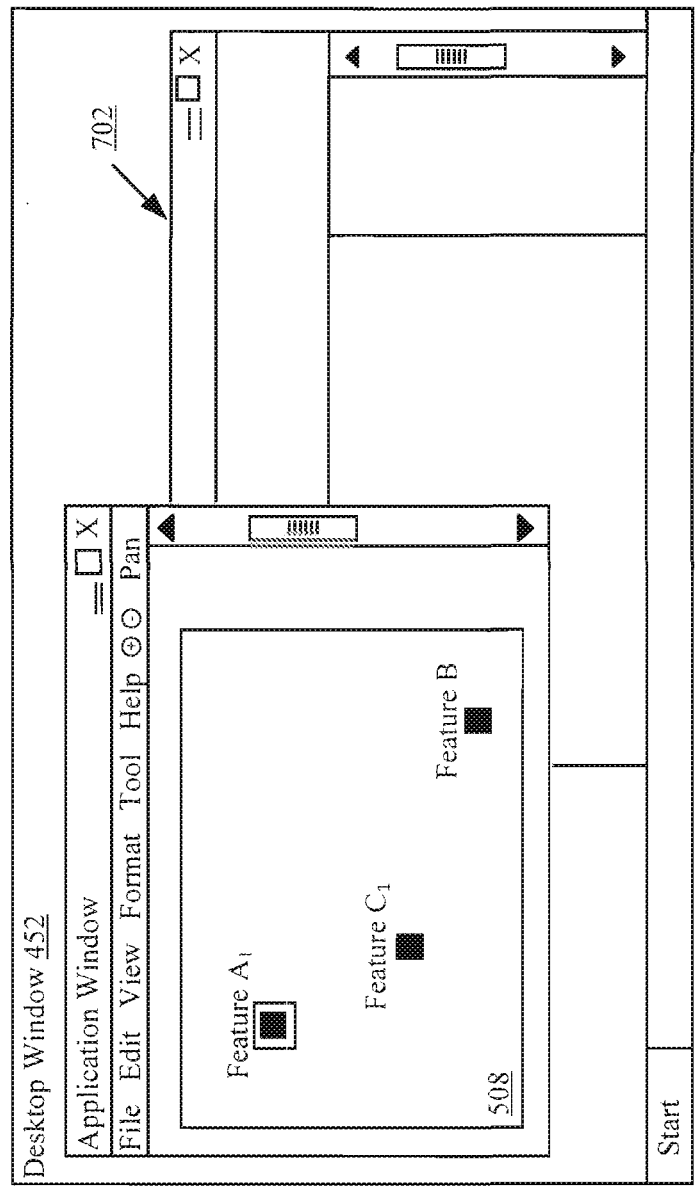
FIG. 9 is schematic illustration of an exemplary image displayed in an application window that is useful for understanding the present invention.

Referring again to FIG. 3A, a next step 326 involves receiving a user input for selecting a first "feature" contained in the first image displayed in the application window. A schematic illustration of a selected feature $A_1$ of a displayed image 508 is shown in FIG. 9. In some embodiments, the feature $A_1$ is selected by moving a mouse cursor thereover and clicking a mouse button. As shown in FIG. 9, the selected feature $A_1$ is surrounded by a rectangle. Embodiments of the present invention are not limited in this regard. Any type of mark or annotation can be used to illustrate that a particular feature of an image has been selected.

Figure 3B:
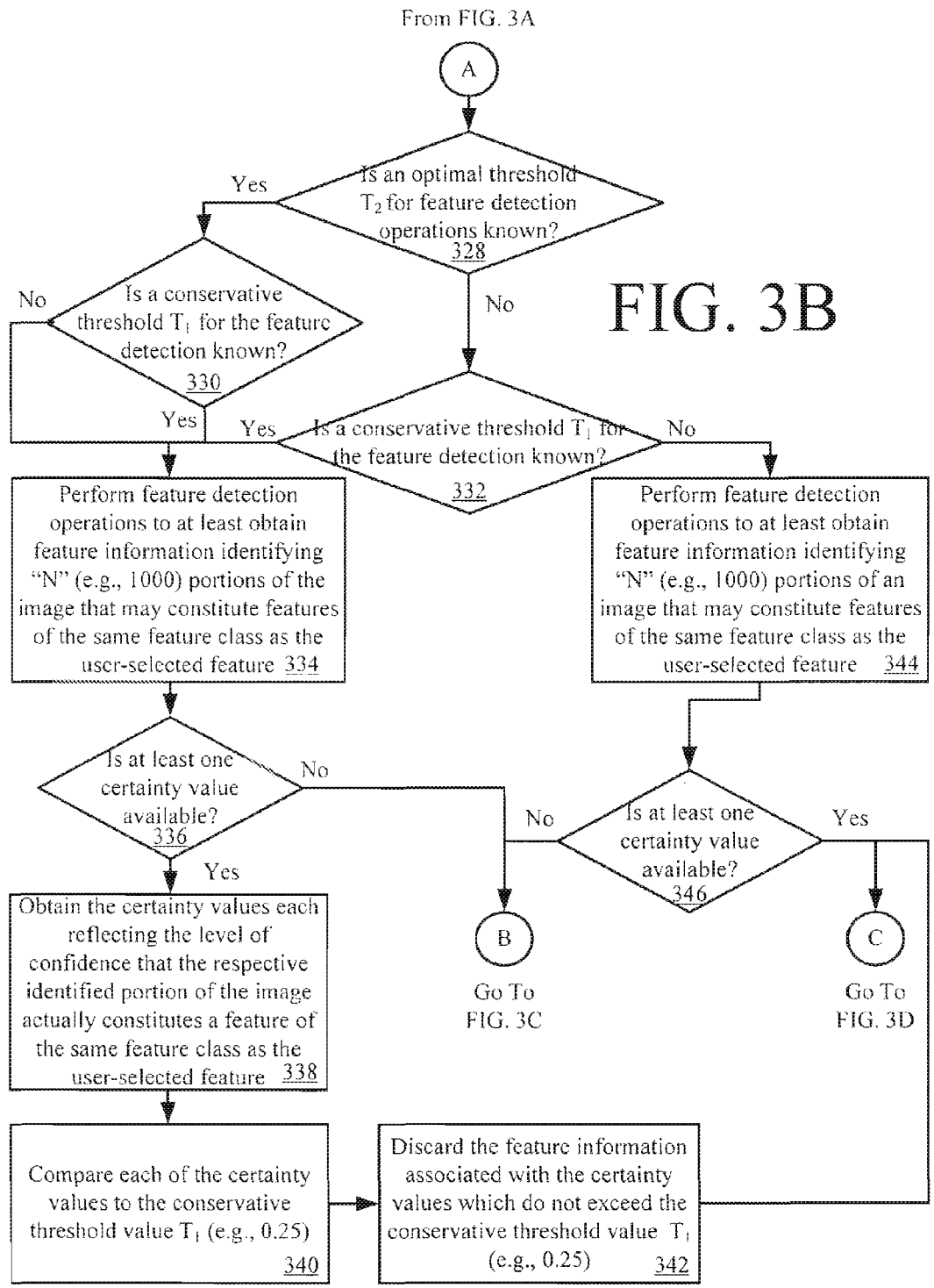

In response to the user-software interaction of step 326, the method 300 continues with decision steps 328, 330 and 332 of FIG. 3B. As shown in FIG. 3B, decision step 328 is performed to determine if an optimal threshold $T_2$ for feature detection operations is known. Decision steps 330 and 332 are performed to determine if a conservative threshold $T_1$ for feature detection operations is known. If the optimal threshold $T_2$ and the conservative threshold $T_1$ are not known [328:NO and 332:NO], then step 344 is performed where feature detection operations are performed to at least obtain feature information identifying "N" (e.g., 1000) portions of an image that may constitute features of the same feature class as the user-selected feature (e.g., feature $A_1$ of FIG. 9). It should be understood that step 344 can also involve obtaining one or more feature detection metrics. In some embodiments, the feature detection metrics include certainty values. Each of the certainty values reflects the level of confidence that the respective portion of the image actually constitutes a feature of the same feature class as the user-selected feature. After completing the feature detection operations, a decision step 346 is performed. Decision step 346 is performed to determine if one or more certainty values (or other feature detection metric) are available. If one or more certainty values are not available [346:NO], then the method 300 continues with step 348 of FIG. 3C. Step 348 of FIG. 3C will be described below. Alternatively, if one or more certainty values are available [346:YES], then the method 300 continues with step 358 of FIG. 3D. Step 358 of FIG. 3D will be described below.

Figure 30:
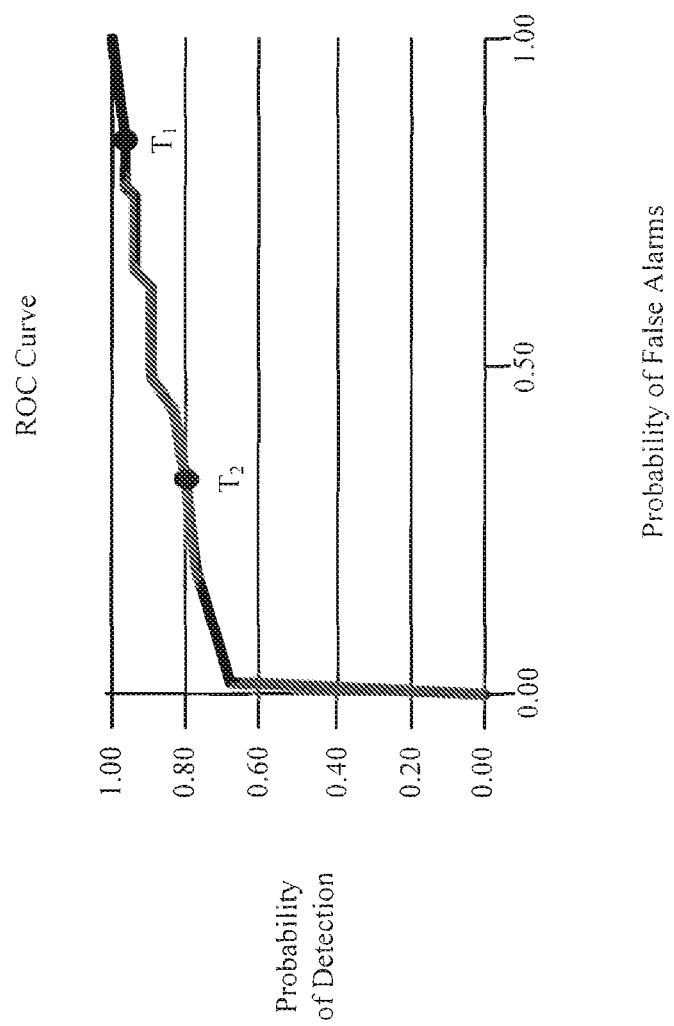
FIG. 30 is a schematic illustration of an exemplary Receiver Operator Characteristic ("ROC") curve that is useful for understanding the present invention.

If both the optimal threshold $T_2$ and the conservative threshold $T_1$ are known [328:YES and 330:YES], then step 334 is performed. Similarly, if only the conservative threshold $T_1$ is known [328:NO and 332:YES], then step 334 is performed. The conservative threshold $T_1$ may be determined using an ROC curve. ROC curves are well known in the art, and will not be described in detail herein. However, a schematic illustration of an exemplary ROC curve is provided in FIG. 30. As shown in FIG. 30, the conservative threshold $T_1$ is selected to be inclusive of all true positives so that a minimal number of false negatives is ensured. For maximum efficiency, the value of the conservative threshold $T_1$ may depend on the feature detection algorithm employed, a total size of an image, and a total number of features detected in the image. Embodiments of the present invention are not limited in this regard. For example, the conservative threshold $T_1$ may alternatively or additionally be determined using a frequency histogram. Frequency histograms are well known in the art, and therefore will not be described herein. In all of the above scenarios, the value of the conservative threshold $T_1$ is selected to minimize false negatives and rapidly remove false positives during a subsequent validation process (e.g., validation processes of steps 354, 356, 364, 368 and 387).

Step 334 involves performing the feature detection operations to at least obtain the feature information identifying "N" (e.g., 1000) portions of the image that may constitute features of the same feature class as the user-selected feature (e.g., feature $A_1$ of FIG. 9). Next, a decision is made as to whether one or more certainty values (or other feature detection metrics) are available, as shown by decision step 336. If there are no available certainty values [336:NO], then the method 300 continues with step 348 of FIG. 3C. Step 348 of FIG. 3C will be described below. In contrast, if there is at least one certainty value available [336:YES], then step 338 is performed.

Step 338 involves obtaining the available certainty values. Next in step 340, each of the certainty values (e.g., values between zero and one, inclusive) is compared to the conservative threshold value $T_1$ (e.g., one fourth) for purposes of identifying certainty values that do not exceed the conservative threshold value $T_1$. The feature information associated with the identified certainty values is discarded, as shown by step 342. As a result of the discarding operations of step 342, only a portion of the feature information which identifies "M" (e.g., 750) portions of the image that may constitute features is available for subsequent analysis. Thereafter, the method 300 continues with step 358 of FIG. 3D. Step 358 of FIG. 3D will be described below.

Figure 3C:
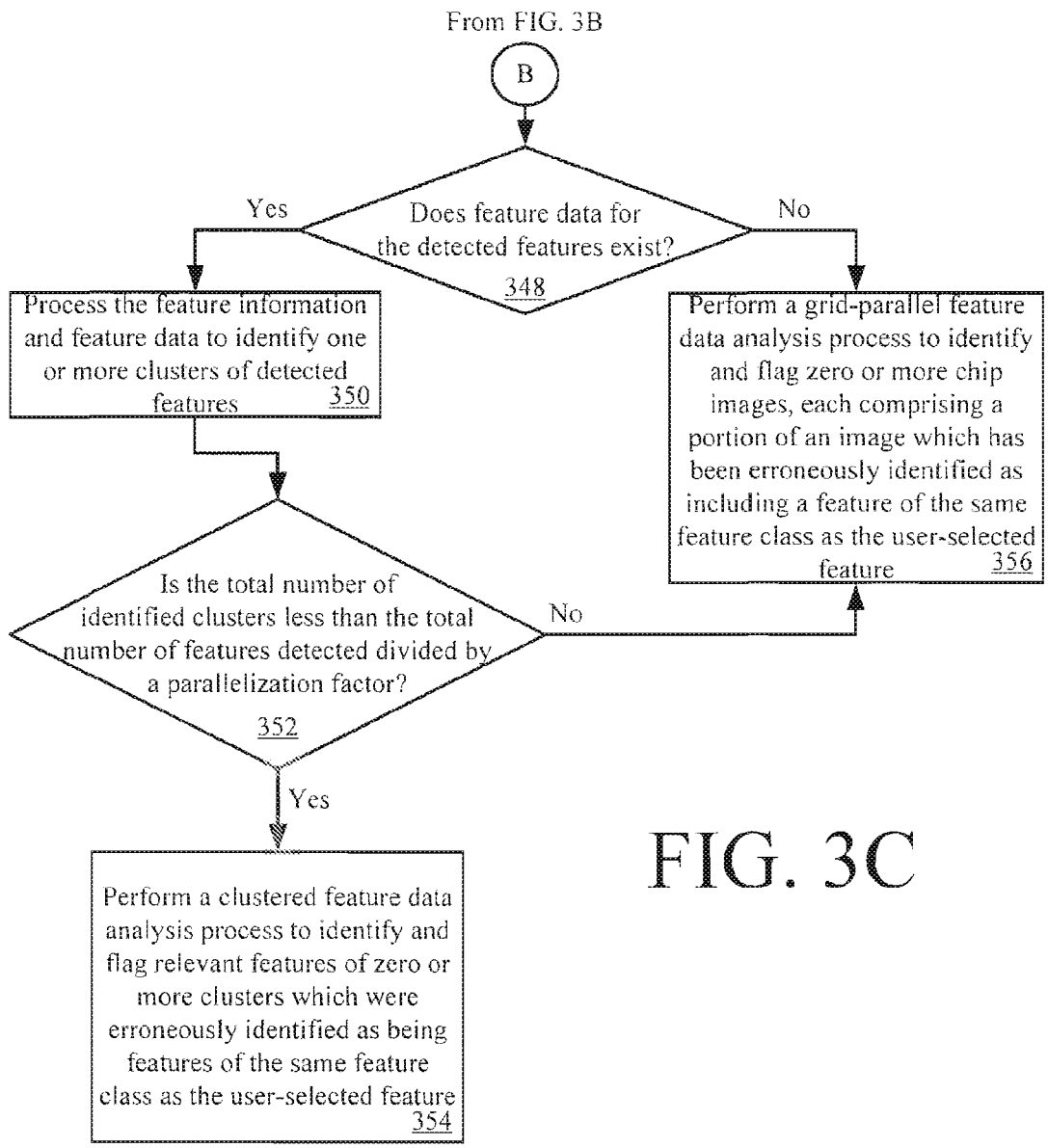

Referring now to FIG. 3C, decision step 348 is performed to determine whether feature data for the "detected features" exist. The feature data can include, but is not limited to, spatial feature data. Spatial feature data includes, but is not limited to, data that identifies the geographic locations of features and boundaries on Earth. Non-spatial feature data includes, but is not limited to, feature data where individual features may not relate to each other spatially (e.g., data defining fingerprints). The phrase "detected features", as used herein, refers to the portions of an image that were identified as possibly constituting features of the same feature class as a given feature of the image. If feature data does not exist for the "detected features" [348:NO], then step 356 is performed.

Step 356 involves performing a grid-parallel feature data analysis process. The grid-parallel feature data analysis processes is generally performed to verify that the "detected features" do not comprise "false positives". In this regard, it should be understood that, during the grid-parallel feature data analysis process, at least one chip image may be marked so as to indicate that it comprises a portion of an image which was erroneously identified during feature detection/extraction operations as including a feature of the same feature class as the user-selected feature (e.g., feature $A_1$ of FIG. 9). An exemplary grid-parallel feature data analysis process that can be performed in step 356 will be described below in relation to FIGS. 17-20.

If feature data does exist for the "detected features" [348:YES], then step 350 is performed where the feature information and feature data is processed to identify one or more clusters of detected features. A "cluster of detected features" comprises two or more "detected features" which are located a certain distance from each other (e.g., ten pixels apart). Upon completing step 350, a decision step 352 is performed to determine if the total number of identified clusters is less than a reference number. The reference number is the result of dividing the total number of features detected by a parallelization factor. As noted above, the phrase "parallelization factor" refers to a number defined by a pre-defined grid size for a grid of chip images. For example, if a grid has a size of ten cells by ten cells, then the parallelization factor is one hundred (i.e., the result of multiplying ten by ten). Similarly, if a grid has a size of three cells by four cells, then the parallelization factor is twelve (i.e., the result of multiplying three by four).

If the total number of identified clusters is greater than or equal to the reference number [352:NO], then step 356 is performed. As noted above, step 356 involves performing a grid-parallel feature data analysis. An exemplary grid-parallel feature data analysis process that can be performed in step 356 will be described below in relation to FIGS. 17-20.

If the total number of identified clusters is less than the reference value [352:YES], then step 354 is performed. In step 354, a cluster feature data analysis process is performed. The cluster feature data analysis process is generally performed to verify that the "detected features" do not comprise "false positives". In this regard, it should be understood that, during the cluster feature data analysis process, at least one feature of at least one cluster may be marked so as to indicate that it was erroneously identified during feature detection/extraction operations as being a feature of the same feature class as the user-selected feature (e.g., feature $A_1$ of FIG. 9). An exemplary clustered feature data analysis process that can be performed in step 354 will be described below in relation to FIGS. 10-16.

Figure 3D:
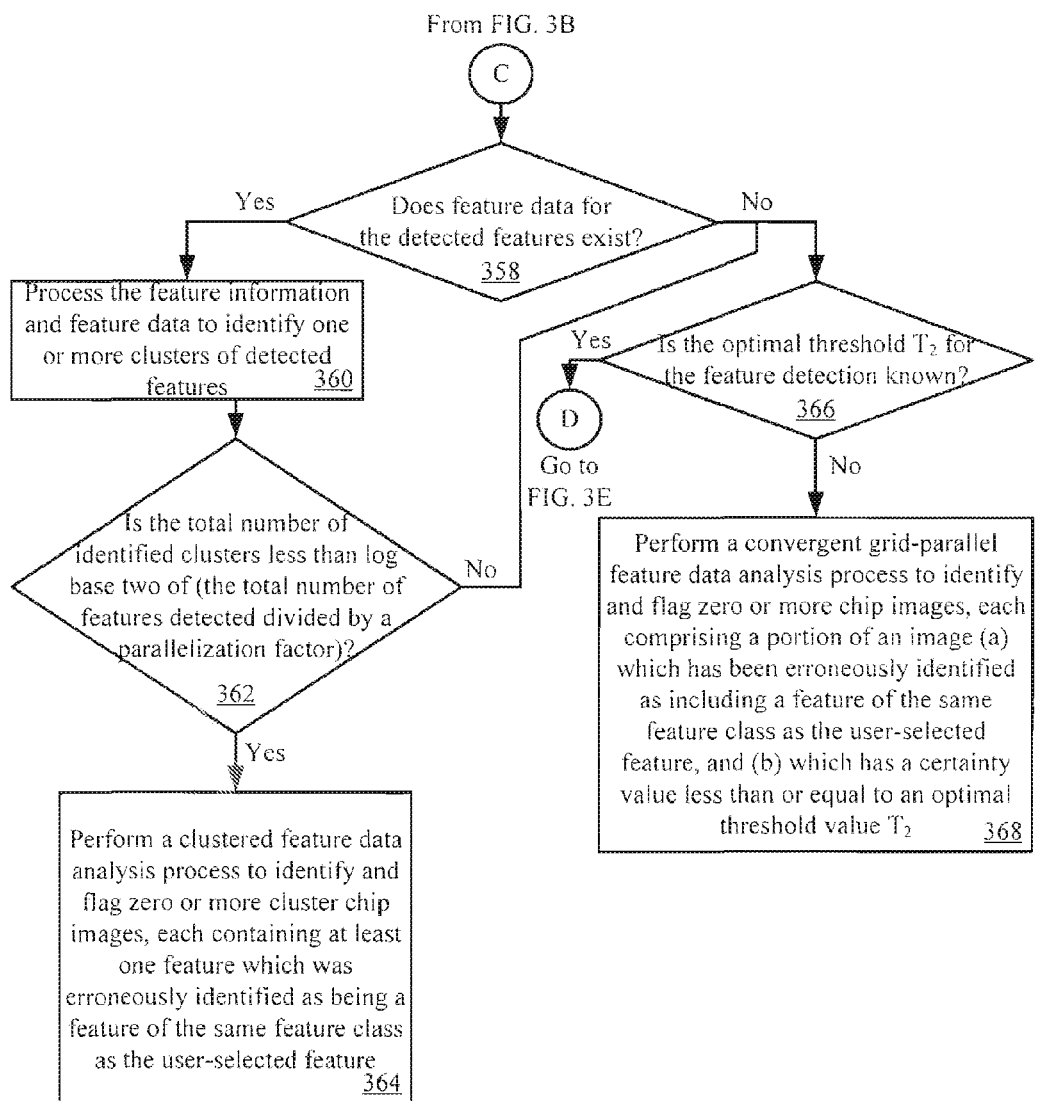

Referring now to FIG. 3D, decision step 358 involves determining if feature data for the "detected features" exist. If feature data does not exist for the "detected features" [358:NO], then the method 300 continues with a decision step 366. Decision step 366 will be discussed below. If feature data does exist for the "detected features" [358:YES], then the method 300 continues with step 360. Step 360 involves processing the feature information and feature data to identify one or more clusters of "detected features". Thereafter, a decision step 362 is performed to determine whether the total number of clusters is less than log base two of the reference number (i.e., the result of dividing the total number of features detected by a parallelization factor). If the total number of clusters is less than log base two of the reference number [362:YES], then the method 300 continues with step 364 where a clustered feature data analysis process is performed.

The clustered feature data analysis process is generally performed to verify that the "detected features" do not comprise false positives. In this regard, it should be understood that, during the clustered feature data analysis process, at least one cluster chip image may be marked so as to indicate that it contains at least one feature which was erroneously identified during feature detection/extraction operations as being a feature of the same feature class as the user-selected feature (e.g., feature $A_1$ of FIG. 9). An exemplary clustered feature data analysis process that can be performed in step 364 will be discussed below in relation to FIGS. 10-16.

If the total number of clusters is equal to or greater than log base two of the reference number [362:NO], then the method 300 continues with decision step 366. Decision step 366 involves determining whether the optimal threshold $T_2$ for the feature detection operations is known. If the optimal threshold $T_2$ is not known [366:NO], then step 368 is performed. In step 368, a convergent grid-parallel feature data analysis process is performed. The convergent grid-parallel feature data analysis process is generally performed to verify that the "detected features" do not comprise false positives. In this regard, it should be understood that, during the convergent grid-parallel feature data analysis process, a set of detected features which having certainty values that bracket the optimal threshold $T_2$ are identified. Once the set of detected features is identified, at least one chip image may be marked or annotated. The marked or annotated chip image comprises a portion of an image (a) which has been erroneously identified as including a feature of the same feature class as the user-selected feature (e.g., feature $A_1$ of FIG. 9), and (b) which has a certainty value equal to or less than the optimal threshold $T_2$. An exemplary convergent grid-parallel feature data analysis process that can be performed in step 364 is discussed below in relation to FIGS. 21-24.

Figure 3E:
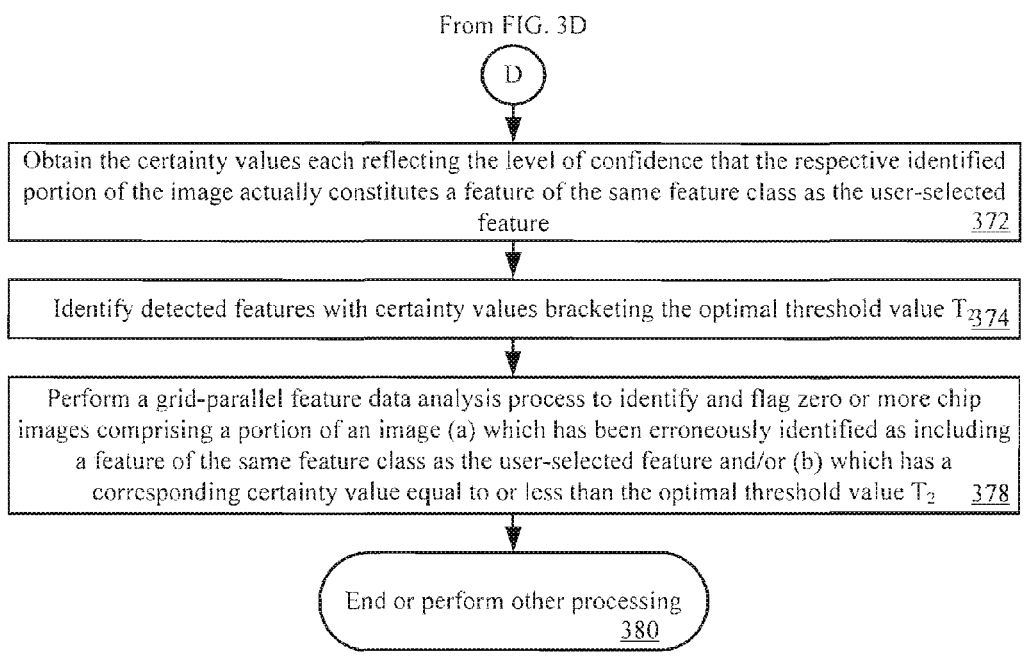

If the optimal threshold $T_2$ is known [366:YES], then the method 300 continues with step 372 of FIG. 3E. As shown in FIG. 3E, step 372 involves obtaining the available certainty values. Thereafter, step 374 is performed where the "detected features" with certainty values bracketing the optimal threshold value $T_2$ are identified. Next, a grid-parallel feature data analysis process is performed in step 378. An exemplary grid-parallel feature data analysis process that can be performed in step 378 is discussed below in relation to FIGS. 25-29. However, it should be understood that, during the grid-parallel feature data analysis process, a user of the computing device is provided direct access to the set of detected features which have certainty values that bracket the optimal threshold value $T_2$. Once provided this direct access, one or more chip images may be marked or annotated. The marked or annotated chip image comprises a portion of an image which has been erroneously identified as including a feature of the same feature class as the user-selected feature (e.g., feature $A_1$ of FIG. 9). The marked or annotated chip image may also have a corresponding certainty value that is equal to or less than the optimal threshold $T_2$. Upon completing step 378, step 380 is performed where the method 300 ends or other processing is performed.

Figure 10:
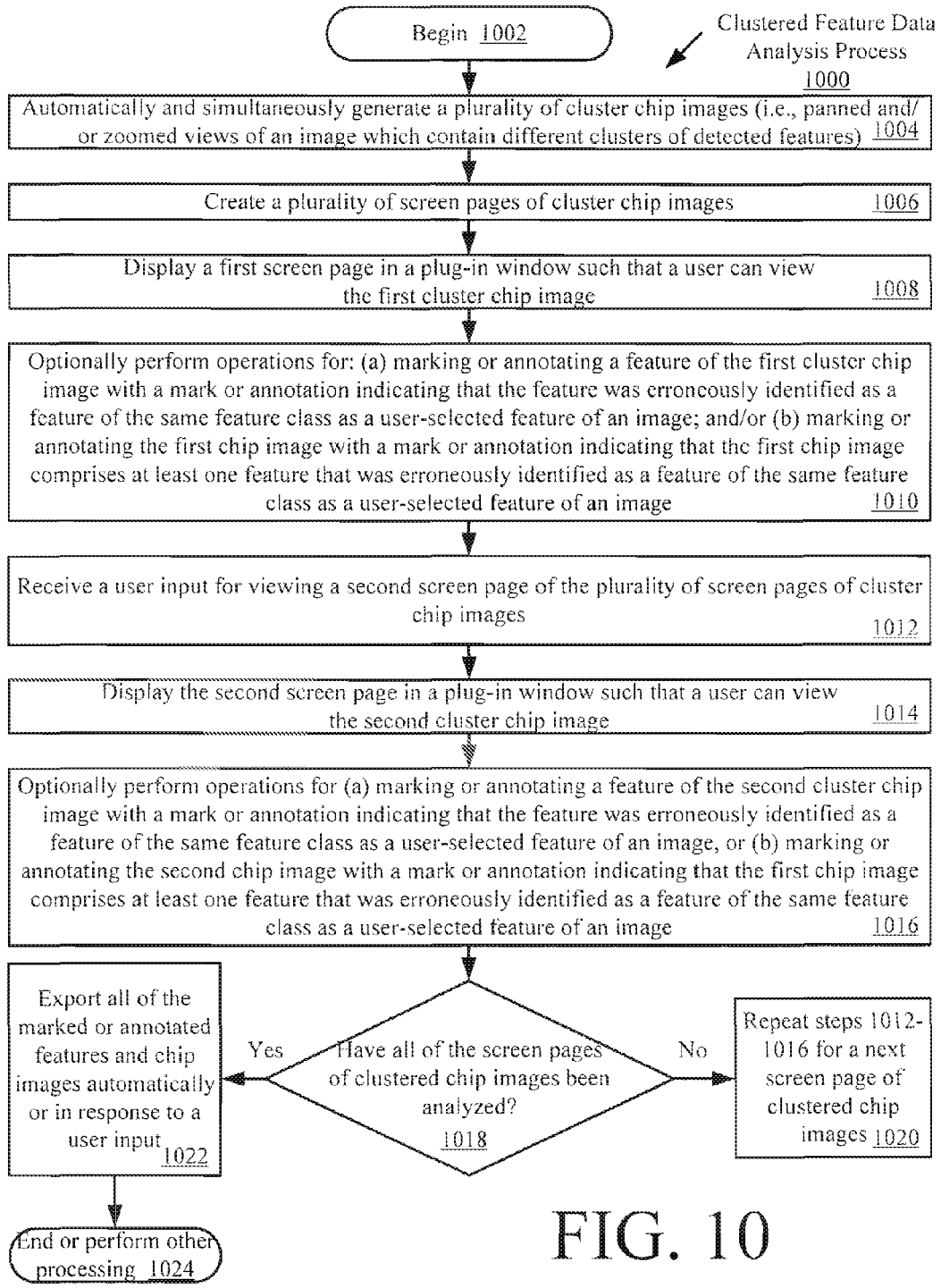
FIG. 10 is a flow diagram of an exemplary clustered feature data analysis process that is useful for understanding the present invention.
Figure 11:
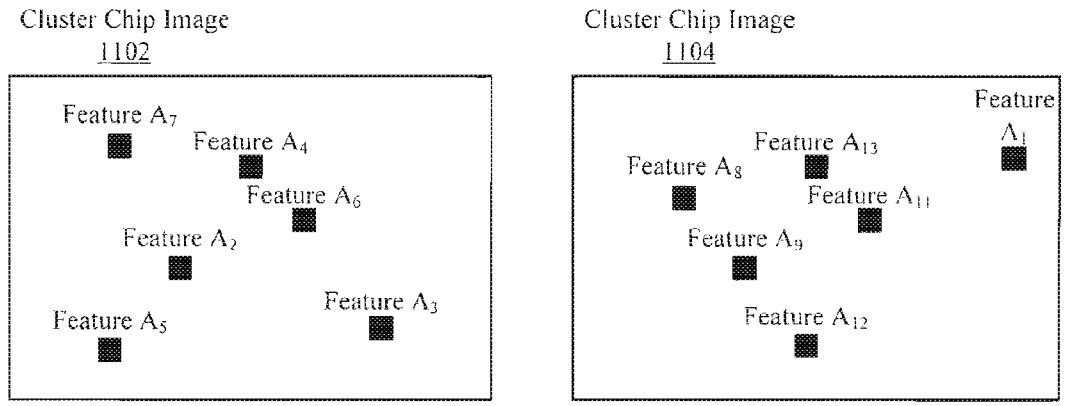
FIG. 11 is a schematic illustration of two exemplary clustered chip images that is useful for understanding the present invention.

Referring now to FIG. 10, there is provided a flow diagram of an exemplary clustered feature data analysis process 1000 that is useful for understanding the present invention. As shown in FIG. 10, process 1000 begins with step 1002 and continues with step 1004. Step 1004 involves automatically and simultaneously generating a plurality of cluster chip images. A cluster chip image is a panned and/or zoomed view of an image which contains a cluster of "detected features". Each cluster comprises a different set of "detected features". Schematic illustrations of two exemplary cluster chip images 1102, 1104 are provided in FIG. 11. As shown in FIG. 11, each of the cluster chip images 1102, 1104 includes a set of "detected features" $A_2, A_3, A_4, A_5, A_6, A_7$ or $A_1, A_8, A_9, A_{10}, A_{11}, A_{12}, A_{13}$. The detected features of each cluster chip image 1102, 1104 are located in relatively close proximity to each other (e.g., twenty pixels from each other).

Figure 12:
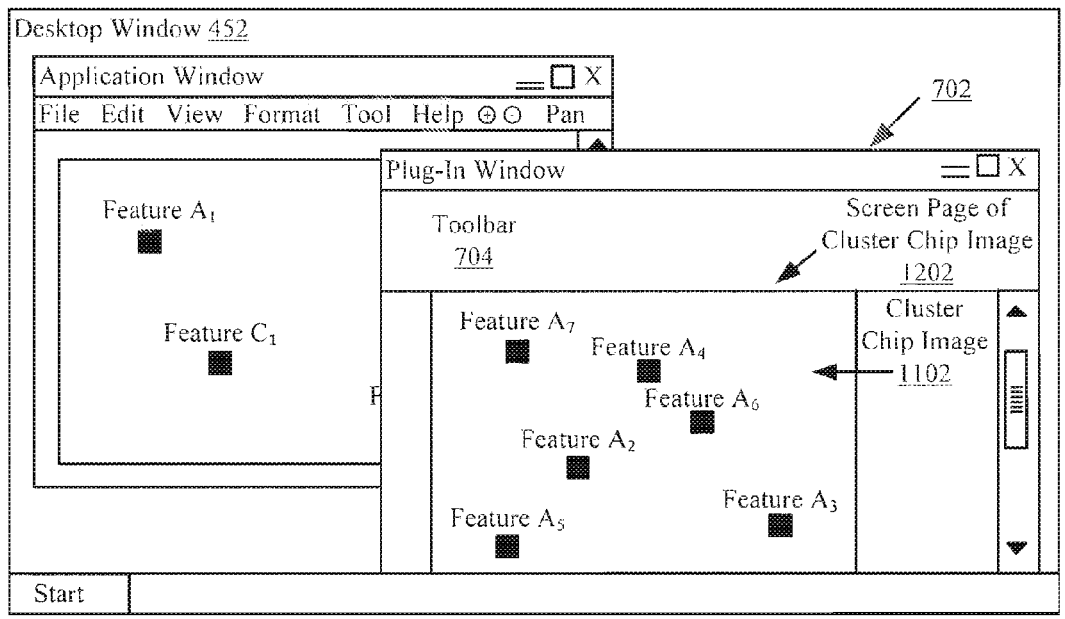
FIG. 12 is a schematic illustration of an exemplary screen page of clustered chip images displayed in a plug-in window that is useful for understanding the present invention.

Upon completing step 1004, step 1006 is performed where a plurality of screen pages of cluster chip images is created. Each screen page includes a single cluster chip image. Thereafter, a first screen page is displayed in a plug-in window (e.g., plug-in window 702 of FIG. 7), as shown by step 1008. A schematic illustration of an exemplary screen page 1202 displayed in a plug-in window 702 is provided in FIG. 12. As shown in FIG. 12, the screen page 1202 comprises a cluster chip image 1102. As such, a user can view the cluster chip image 1102 at full resolution.

In a next step 1010, a computing device (e.g., computing device 102 of FIG. 1) optionally performs operations for: (a) marking or annotating a feature of the displayed cluster chip image with a mark or annotation indicating that the feature was erroneously identified as a feature of the same feature class as a user-selected feature of an image (e.g., feature $A_1$ of FIG. 9); and/or (b) marking or annotating the displayed chip image with a mark or annotation indicating that the chip image comprises at least one feature that was erroneously identified as a feature of the same feature class as a user-selected feature of an image (e.g., feature $A_1$ of FIG. 9). These operations can be performed by the computing device in response to a user input. In this regard, step 1010 can involve selecting a displayed chip image or selecting a feature of the displayed chip image. The chip image or feature can be selected by moving a mouse cursor thereover and clicking a mouse button. In response to the click of the mouse button, a menu is presented to the user of the computing device. The menu includes a list of commands, such as a command for enabling "flag/unflag feature" operations or "flag/unflag chip image" operations of the feature analysis plug-in. In response to the user selection of the flag/unflag feature" command or the "flag/unflag chip image" command, the feature analysis plug-in adds a mark or annotation on or adjacent to the selected feature or chip image.

Figure 13:
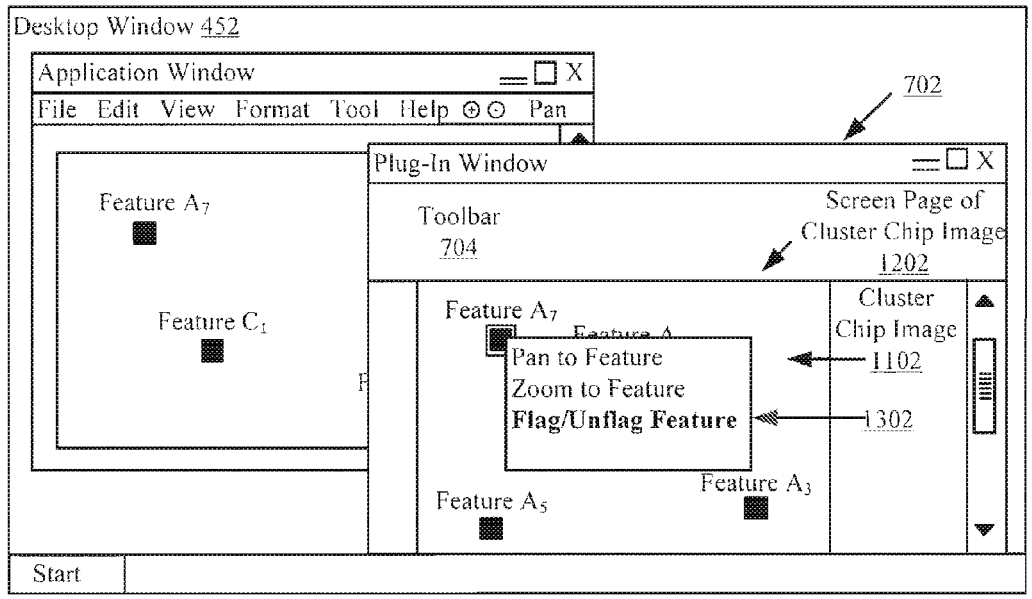
FIG. 13 is a schematic illustration of an exemplary selected feature of a cluster chip image and a menu of commands that is useful for understanding the present invention.

A schematic illustration of an exemplary selected feature $A_7$ of a cluster chip image 1102 and an exemplary menu 1302 is provided in FIG. 13. As shown in FIG. 13, the selected feature $A_7$ is surrounded by a rectangular distinctly colored border. Also, a selected "Flag/Unflag Feature" command of the menu 1302 is annotated by bolding the text thereof. Embodiments of the present invention are not limited in this regard. Any type of mark or annotation can be used to illustrate that a particular feature has been selected and/or that a particular command of a menu has been selected.

Figure 14:
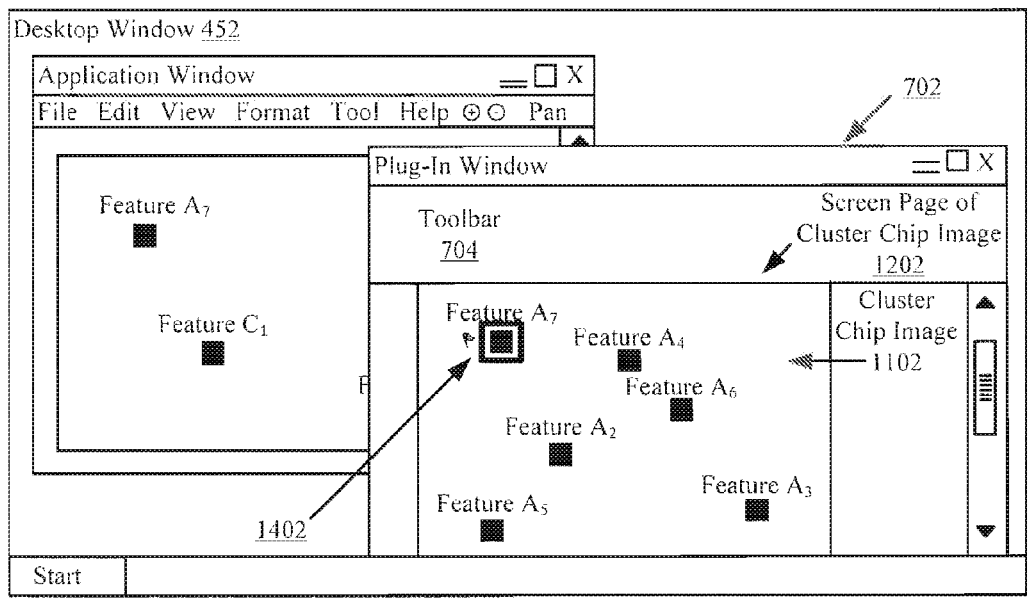
FIG. 14 is a schematic illustration of an exemplary cluster chip image in which a feature thereof has been marked or annotated that is useful for understanding the present invention.

A schematic illustration of a marked or annotated feature $A_7$ is provided in FIG. 14. As shown in FIG. 14, a flag 1402 has been added to the cluster chip image at a location that is adjacent to the selected feature $A_7$. Embodiments of the present invention are not limited in this regard. Any type of mark or annotation can be employed for indicating that a feature was erroneously identified as a feature of the same feature class as a user-selected feature of an image.

Figure 15:
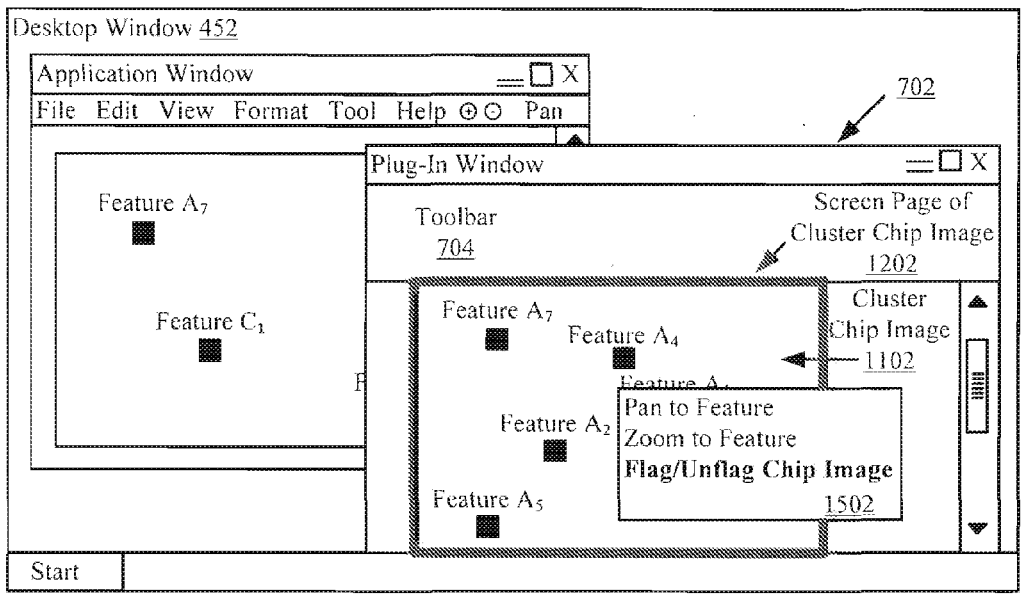
FIG. 15 is a schematic illustration of an exemplary selected cluster chip image that is useful for understanding the present invention.

A schematic illustration of an exemplary selected cluster chip image 1102 and an exemplary menu 1502 is provided in FIG. 15. As shown in FIG. 15, the cluster chip image 1102 is surrounded by a rectangular distinctly colored border. Also, a selected "Flag/Unflag Chip Image" command of the menu 1502 is annotated by bolding the text thereof. Embodiments of the present invention are not limited in this regard. Any type of mark or annotation can be used to illustrate that a particular feature has been selected and/or that a particular command of a menu has been selected.

Figure 16:
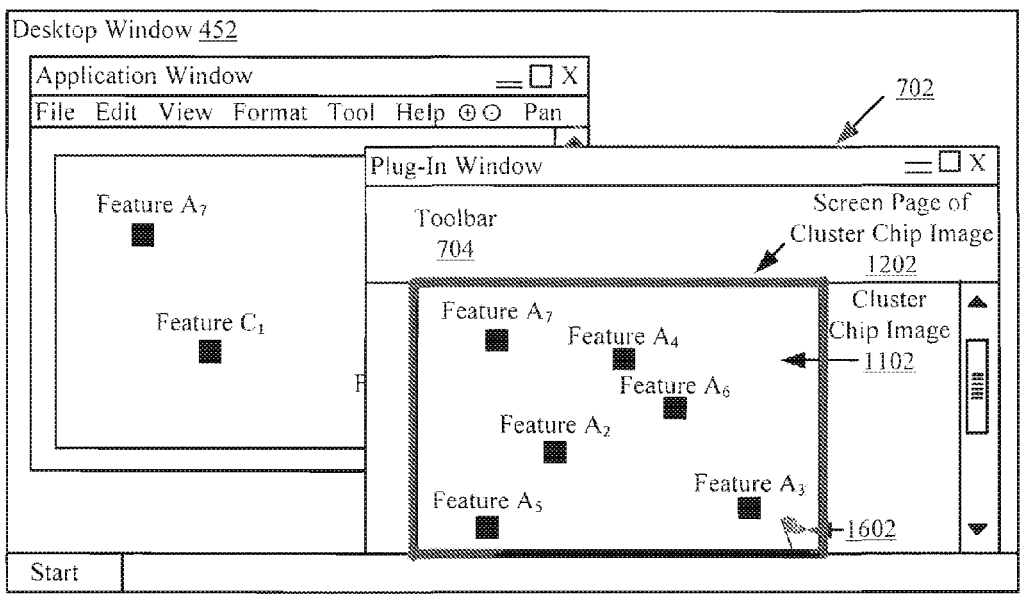
FIG. 16 is a schematic illustration of an exemplary marked or annotated cluster chip image that is useful for understanding the present invention.

A schematic illustration of a marked or annotated cluster chip image 1102 is provided in FIG. 16. As shown in FIG. 16, a flag 1602 has been added to the cluster chip image. Embodiments of the present invention are not limited in this regard. Any type of mark or annotation can be employed for indicating that a cluster chip image comprises a feature that was erroneously identified as a feature of the same feature class as a user-selected feature of an image. Also, the mark or annotation can be placed at any location within the image.

Referring again to FIG. 10, the method 1000 continues with step 1012 where the computing device receives a user input for viewing a second screen page of the plurality of screen pages of cluster chip images in the plug-in window. The user input is facilitated by a GUI widget (e.g., GUI widget 804 or 806 of FIG. 8A) of the plug-in window (e.g., the plug-in window 702 of FIG. 7). The GUI widget may be configured to facilitate moving through screen pages of cluster chip images. In this regard, the GUI widget includes arrow buttons that allow a user to move forward and backward through the screen pages of cluster chip images. Alternatively or additionally, the GUI widget may be configured to facilitate jumping to a desired screen page for review. In this regard, the GUI widget includes a text box for entering a screen page number and a search button for causing the screen page having the entered screen page number to be displayed in the display area (e.g., display area 706 of FIG. 7) of the plug-in window (e.g., plug-in window 702 of FIG. 7).

After the user input is received in step 1012, the method 1000 continues with step 1014. Step 1014 involves displaying the second screen page in the plug-in window. In a next step 1016, the computing device (e.g., computing device 102 of FIG. 1) optionally performs operations for: (a) marking or annotating a feature of the displayed cluster chip image with a mark or annotation indicating that the feature was erroneously identified as a feature of the same feature class as a user-selected feature of an image (e.g., feature $A_1$ of FIG. 9); and/or (b) marking or annotating the displayed chip image with a mark or annotation indicating that the chip image comprises at least one feature that was erroneously identified as a feature of the same feature class as a user-selected feature of an image (e.g., feature $A_1$ of FIG. 9). These operations can be performed by the computing device in response to a user input. In this regard, step 1016 can involve selecting a displayed chip image or selecting a feature of the displayed chip image. The chip image or feature can be selected by moving a mouse cursor thereover and clicking a mouse button. In response to the click of the mouse button, a menu is presented to the user of the computing device. The menu includes a list of commands, such as a command for enabling "flag/unflag feature" operations or "flag/unflag chip image" operations of the feature analysis plug-in. In response to the user selection of the flag/unflag feature" command or the flag/unflag chip image" command, the feature analysis plug-in adds a mark or annotation on or adjacent to the selected feature or chip image.

After completing step 1016, a decision step 1018 is performed for determining if all of the screen pages of clustered chip images have been analyzed. If all of the screen pages of clustered chip images have not been analyzed [1018:NO], then step 1020 is performed. In step 1020, steps 1012-1016 are repeated for a next screen page including a cluster chip image. If all of the screen pages of clustered chip images have been analyzed [1018:YES], then step 1022 is performed. Step 1022 involves exporting all of the marked or annotated features and cluster chip images automatically or in response to a user input to a table or file. The exportation can be initiated by a user of the computing device using a GUI widget (e.g., GUI widget 816 or 818 of FIG. 8A) of the plug-in window. Thereafter, step 1024 is performed where the method 1000 ends or other processing is performed.

Figure 17:
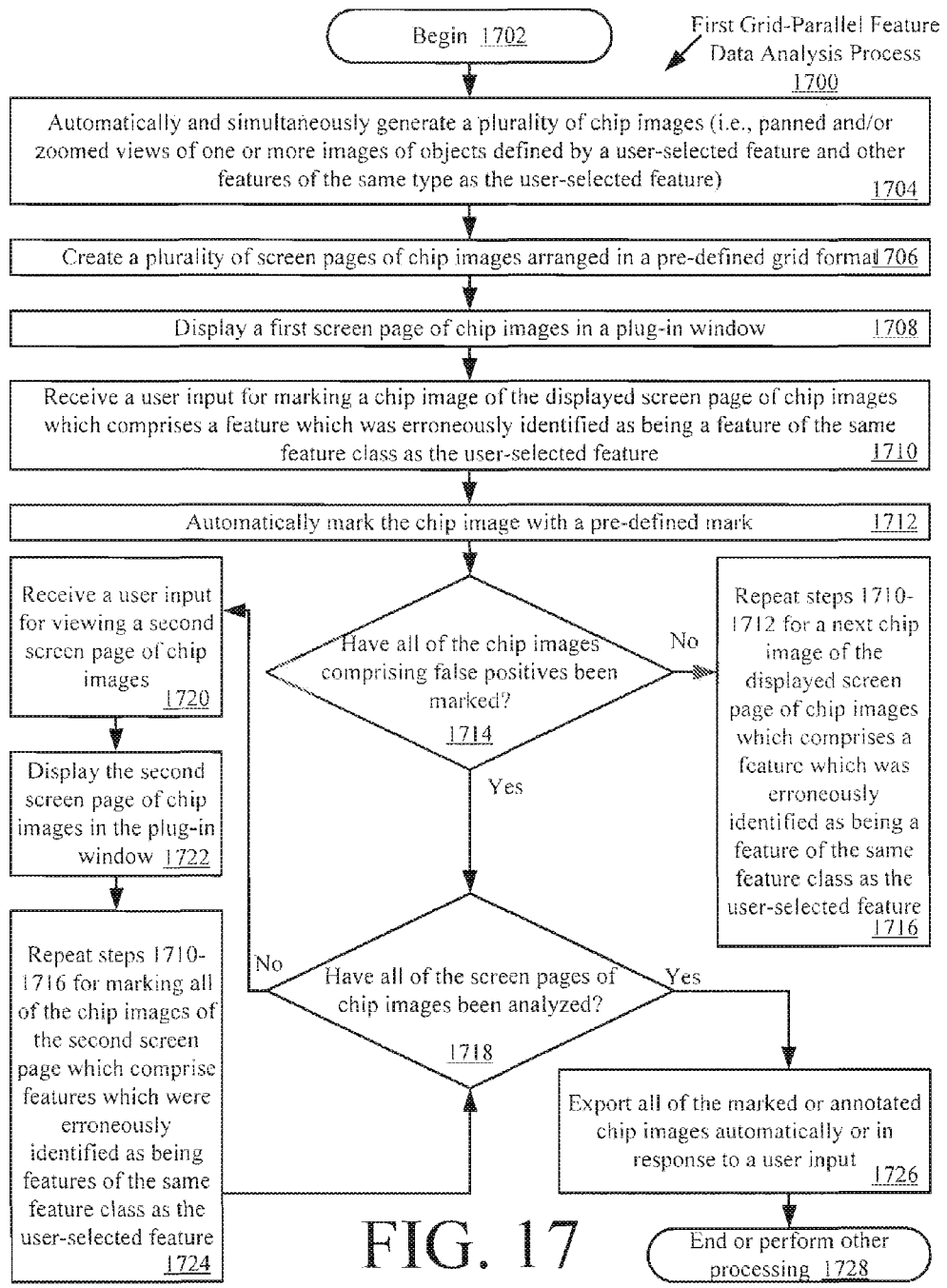
FIG. 17 is a flow diagram of an exemplary first grid-parallel feature data analysis process that is useful for understanding the present invention.

Referring now to FIG. 17, there is provided a flow diagram of an exemplary first grid-parallel feature data analysis process 1700 that is useful for understanding the present invention. As shown in FIG. 17, process 1700 begins with step 1702 and continues with step 1704. Step 1704 involves automatically and simultaneously generating a plurality of chip images by the feature analysis plug-in. The chip images are generated using the feature list generated in step 314 of FIG. 3A, the feature data for the features which are of the same type as the feature selected in previous step 326 of FIG. 3A, and/or the image data for the first image. The chip images include panned and/or zoomed views of one or more images of objects defined by a user-selected feature (e.g., feature $A_1$ of FIG. 9) and other features of the same type as the user-selected feature. The chip images can have a default zoom level of scale or resolution. The "area of interest" can be a pre-defined area of interest (e.g., Florida) or a user-specified area of interest (e.g., West Palm Beach, Fla.). The user can specify the "area of interest" by selecting an item from a list or by selecting a portion of the image.

Figure 18:
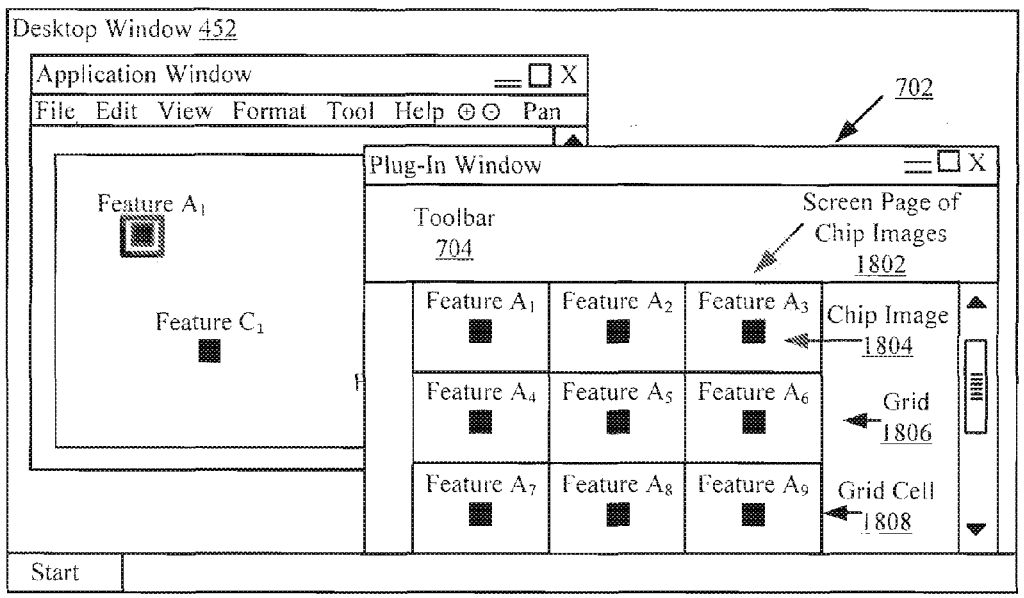
FIG. 18 is a schematic illustration of an exemplary screen page of chip images displayed in a plug-in window that is useful for understanding the present invention.

Upon completing step 1704, step 1706 is performed where at least one screen page of chip images is created by the feature analysis plug-in. The chip images are arranged on the screen page in a grid or matrix format. The grid or matrix of the chip images has a default size (e.g., ten cells by ten cells) or a user-specified size (e.g., three cells by four cells). In a next step 1708, a first screen page of the chip images is displayed in a plug-in window. A schematic illustration of a displayed screen page of chip images 1802 is provided in FIG. 18. As shown in FIG. 18, the screen page 1802 comprises a grid 1806 defined by a plurality of grid cells 1808. A different chip image 1804 is presented within each grid cell 1808 of the grid 1806.

Referring again to FIG. 17, the process 1700 continues with step 1710. In step 1710, a user input is received by the computing device for marking or annotating a chip image of the displayed screen page which comprises a feature that was erroneously identified as being a feature of the same feature class as the user-selected feature (e.g., feature $A_1$ of FIG. 9). Step 1710 can involve selecting a chip image. The chip image can be selected by moving a mouse cursor over the chip image and clicking a mouse button. In response to the click of the mouse button, a menu is presented to the user of the computing device. The menu includes a list of commands, such as a command for enabling "flag/unflag" operations of the feature analysis plug-in.

Figure 19:
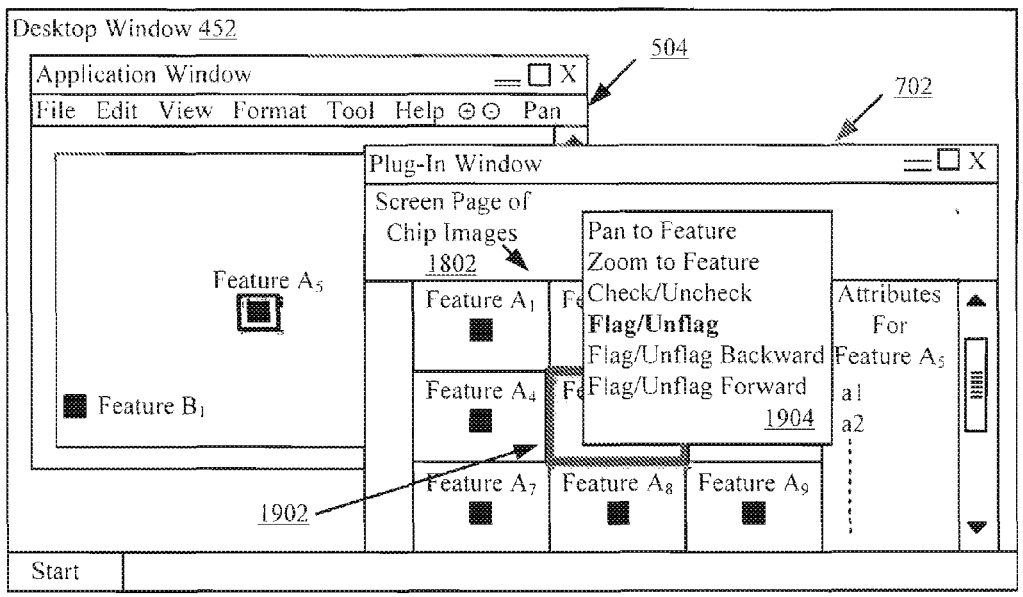
FIG. 19 is a schematic illustration of an exemplary selected chip image and menu of commands that is useful for understanding the present invention.
Figure 20:
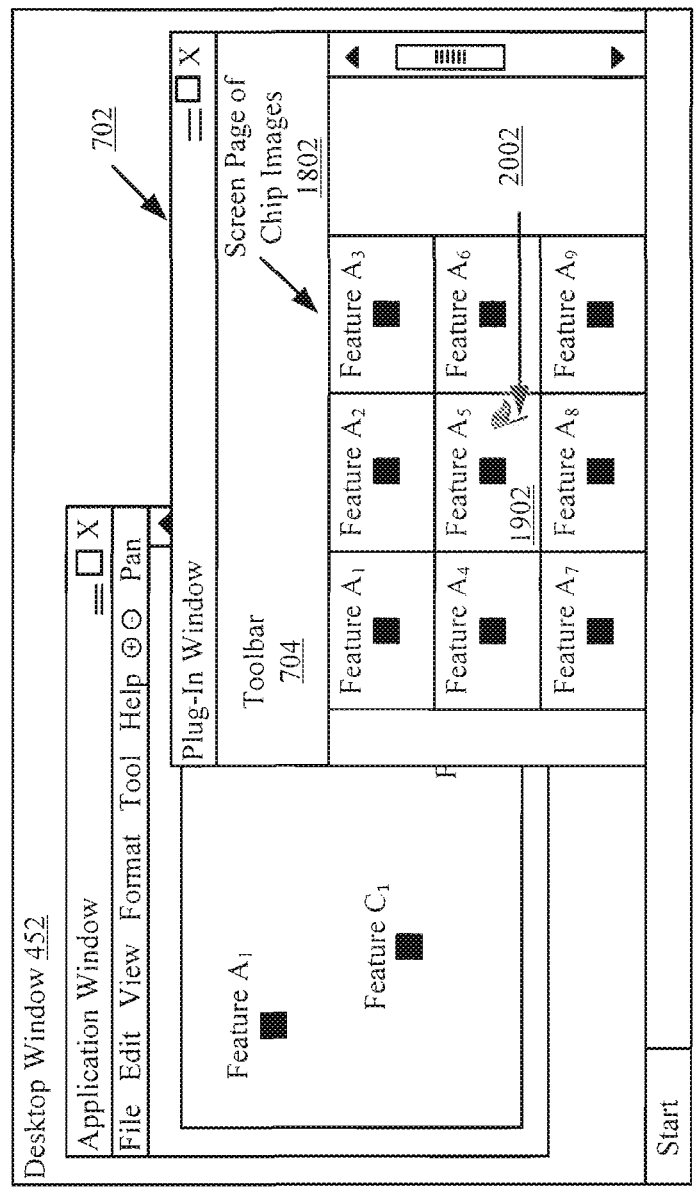
FIG. 20 is a schematic illustration of an exemplary screen page with a marked or annotated chip image that is useful for understanding the present invention.

A schematic illustration of an exemplary selected chip image 1902 and an exemplary menu 1904 is provided in FIG. 19. As shown in FIG. 19, the selected chip image 1902 is annotated with a relatively thick and distinctly colored border. Also, a selected command "Flag/Unflag" of the menu 1904 is annotated by bolding the text thereof. Embodiments of the present invention are not limited in this regard. Any type of mark or annotation can be used to illustrate that a particular chip image has been selected and/or that a particular command of a menu has been selected.

In response to the reception of the user input in step 1710 of FIG. 17, the feature analysis plug-in performs step 1712. In step 1712, the selected chip image is automatically marked with a pre-defined mark. A schematic illustration of a chip image 1902 marked with a flag 2002 is provided in FIG. 20. Embodiments of the present invention are not limited to the particularities of FIG. 20. Any type of mark or annotation can be employed to illustrate that a chip image comprises a feature which was erroneously identified as being a feature of the same feature class as the user-selected feature. Also, the mark or annotation can be placed at any location on or adjacent to the chip image.

Referring again to FIG. 17, the process 1700 continues with a decision step 1714. Decision step 1714 is performed to determine if all of the chip images comprising false positives have been marked. As noted above, the phrase "false positive" refers to features that were erroneously identified during feature detection/extraction operations as being a feature of the same feature class as the user-selected feature. If all of the displayed chip images comprising false positives have not been marked [1714:NO], then step 1716 is performed. In step 1716, steps 1710-1712 are repeated for a next chip image of the displayed screen page of chip images which comprises a feature which was erroneously identified as being a feature of the same feature class as the user-selected feature. If all of the displayed chip images comprising false positives have been marked [1714:YES], then a decisions step 1718 is performed to determine if all of the screen pages of chip images have been analyzed.

If all of the screen pages have not been analyzed [1718: NO], then steps 1720-1724 are performed. In step 1720, a user input is received by the computing device for viewing a second screen page of chip images in the plug-in window. The user input is facilitated by a GUI widget (e.g., GUI widget 804 or 806 of FIG. 8A) of the plug-in window (e.g., the plug-in window 702 of FIG. 7). The GUI widget may be configured to facilitate moving through screen pages of unsorted and/or sorted chip images. In this regard, the GUI widget includes arrow buttons that allow a user to move forward and backward through the screen pages of unsorted and/or sorted chip images. Alternatively or additionally, the GUI widget may be configured to facilitate jumping to a desired screen page of unsorted and/or sorted chip images for review. In this regard, the GUI widget includes a text box for entering a screen page number and a search button for causing the screen page of unsorted and/or sorted chip images having the entered screen page number to be displayed in the display area (e.g., display area 706 of FIG. 7) of the plug-in window (e.g., plug-in window 702 of FIG. 7).

After the user input is received in step 1720, the process 1700 continues with step 1722. Step 1722 involves displaying the second screen page of chip images in the plug-in window. Thereafter, steps 1710-1716 are repeated for marking all of the chip images of the second screen page which comprise features which were erroneously identified as being features of the same feature class as the user-selected feature (e.g., feature $A_1$ of FIG. 9), as shown by step 1724.

If all of the screen pages have been analyzed [1718:YES], then step 1726 is performed where all of the marked or annotated chip images are exported to a table or a file. The exportation can be initiated by a user of the computing device using a GUI widget (e.g., GUI widget 816 or 818 of FIG. 8A) of the plug-in window. In step 1728, the process 1700 ends or other processing is performed.

Figure 21A:
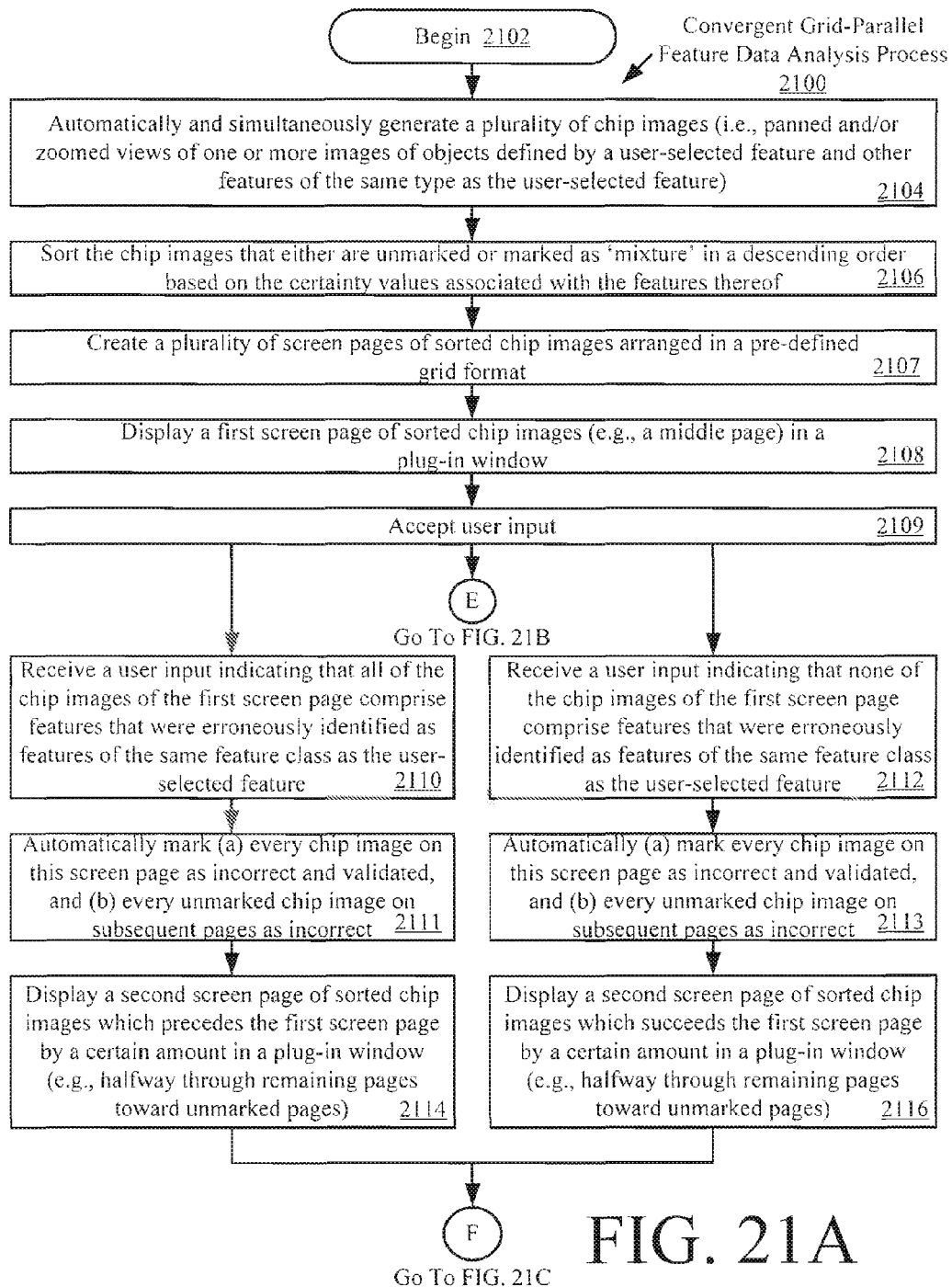

Referring now to FIGS. 21A-21C, there is provided a flow diagram of an exemplary convergent grid-parallel feature data analysis process 2100 that is useful for understanding the present invention. As shown in FIG. 21A, process 2100 begins with step 2102 and continues with step 2104. Step 2104 involves automatically and simultaneously generating a plurality of chip images. The chip images are panned and/or zoomed views of one or more images of objects defined by a user-selected feature (e.g., feature $A_1$ of FIG. 9) and other features of the same type as the user-selected feature.

In a next step 2106, the chip images that are either unmarked or marked as "mixture" in a descending order based on the certainty values associated with the features thereof. The sorting operations of step 2106 are performed by the feature analysis plug-in automatically or in response to a user input. The user input is facilitated by a GUI widget (e.g., GUI widget 814 of FIG. 8A) of the plug-in window (e.g., the plug-in window 702 of FIG. 7). The GUI widget may be configured to allow a user to specify the attribute (e.g., certainty value or other feature detection metric) that the sorting should be based on, and/or specify whether the chip images should be sorted in a descending order.

Upon completing step 2106, step 2107 is performed where a plurality of screen pages of sorted chip images is created by the feature analysis plug-in. The sorted chip images are arranged on each screen page in a pre-defined grid format or a matrix format. A first screen page of sorted chip images is then displayed in the plug-in window, as shown by step 2108. In some embodiments of the present invention, the first screen page of sorted chip images comprises the middle screen page of sorted chip images. A schematic illustration of an exemplary screen page of sorted chip images 2202 is provided in FIG. 22.

Figure 22:
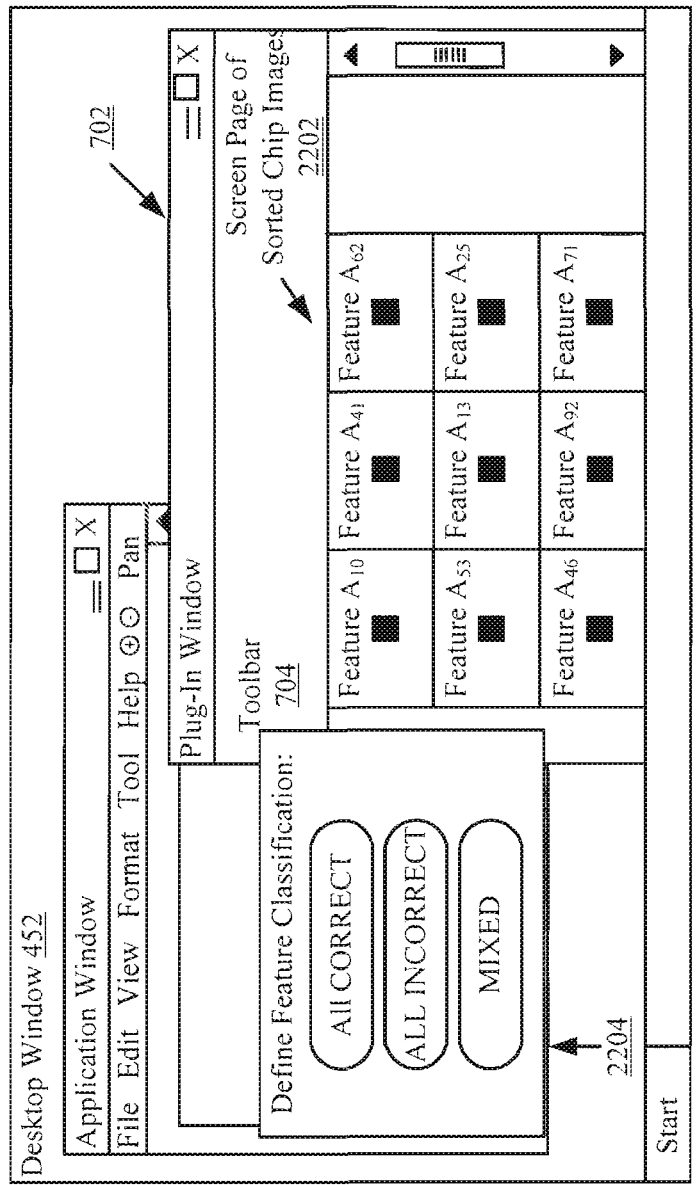
FIG. 22 is a schematic illustration of an exemplary screen page of sorted chip images that is useful for understanding the present invention.

After the first screen page of chip images has been displayed, step 2109 is performed where a user input is accepted. Subsequently, method 2100 continues with step 2110, 2112 and 2115 of FIG. 21B. Step 2115 will be described below. In steps 2110 and 2112, a user performs user-software interactions for indicating that all or none of the displayed chip images comprise features that were erroneously identified as features of the same feature class as the user-selected feature. The user-software interaction can be facilitated by a GUI window displayed on top of a desktop window. A schematic illustration of an exemplary GUI window 2204 for facilitating said user-software interaction is provided in FIG. 22. As shown in FIG. 22, the GUI window 2204 includes text and buttons. Embodiments of the present invention are not limited in this regard. The GUI window can include any type of contents selected in accordance with a particular application.

If the user input indicates that all of the displayed chip images comprise features that were erroneously identified as features of the same feature class as the user-selected feature 2110, then step 2111 is performed where every chip image on the displayed screen page is automatically marked as incorrect and validated. Step 2111 also involves automatically marking every unmarked chip image on subsequent pages as incorrect. Upon completing step 2111, the method 300 continues with step 2114 where a second screen page of sorted chip images is displayed in the plug-in window. In this scenario, the second screen page comprises a screen page which precedes the first screen page of chip images by a certain amount. Stated differently, the second screen page comprises chip images that precede the chip images of the first screen page by a certain amount in the sorted order. Upon completing step 2114, process 2100 continues with step 2118 of FIG. 21C. Step 2118 will be described below.

If the user input indicates that none of the displayed chip images comprise features that were erroneously identified as features of the same feature class as the user-selected feature 2112, then step 2113 is performed where every chip image on the displayed screen page is automatically marked as incorrect and validated. Step 2114 also involves automatically marking every unmarked chip image on subsequent pages as incorrect. Thereafter, step 2116 is performed where a second screen page of chip images is displayed in the plug-in window. In this scenario, the second screen page comprises a screen page which succeeds the first screen page of chip images by a certain amount. Stated differently, the second screen page comprises chip images that succeed the chip images of the first screen page by a certain amount in the sorted order. Upon completing step 2116, process 2100 continues with step 2118 of FIG. 21C.

In step 2118 of FIG. 21C, the method 2100 goes to step 2109 until all chip images are marked. Additionally or alternatively, the method 2100 goes to step 346 of FIG. 3B to further refine the assessment of unmarked or "mixture" image chips using a different certainty metric. Subsequently, step 2122 is performed where all of the marked or annotated chip images are exported to a table or file. The exportation can be initiated by a user of the computing device using a GUI widget (e.g., GUI widget 816 or 818 of FIG. 8A) of the plug-in window. In a next step 2124, process 2100 ends or other processing is performed.

Referring now to FIG. 21B, step 2115 involves receiving a user input indicating that the chip images of the first screen page comprise a "mixture" of features where some are erroneously identified and some are correctly identifies as features of the same feature class as the user-selected feature. Step 2115 can additionally involve optionally permitting the user input to directly flag, unflag, or flag/unflag forward and backward from a selected chip image on the displayed screen page. The chip image is selected by moving a mouse cursor over the chip image and clicking a mouse button. In response to the click of the mouse button, a menu is presented to the user of the computing device. The menu includes a list of commands, such as a command for enabling "Flag/Unflag" operations, "Flag/Unflag Forward" operations, and/or "Flag/Unflag Backward" operations.

Figure 23:
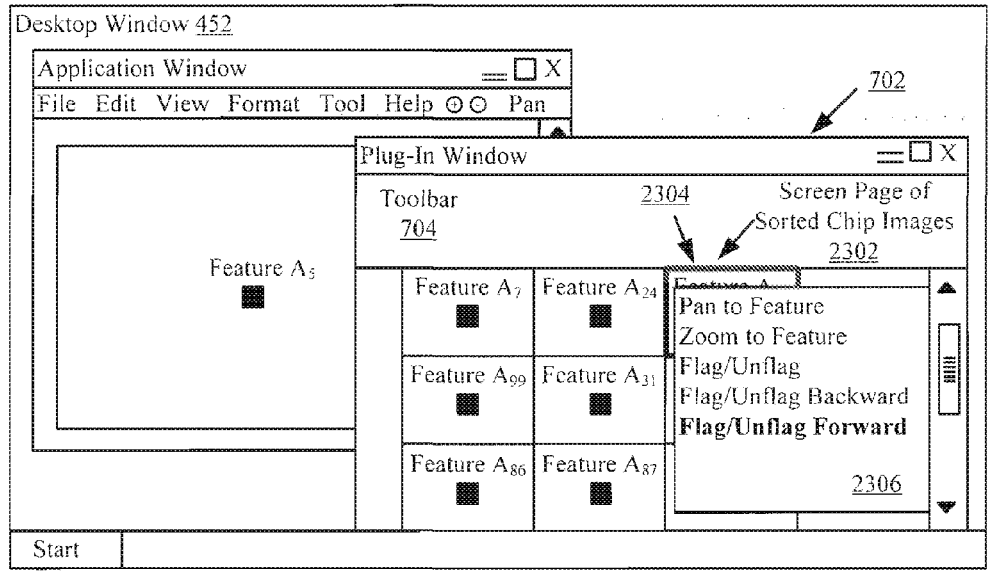
FIG. 23 is a schematic illustration of an exemplary screen page of sorted chip images, an exemplary selected chip image and an exemplary menu of commands that is useful for understanding the present invention.
Figure 24:
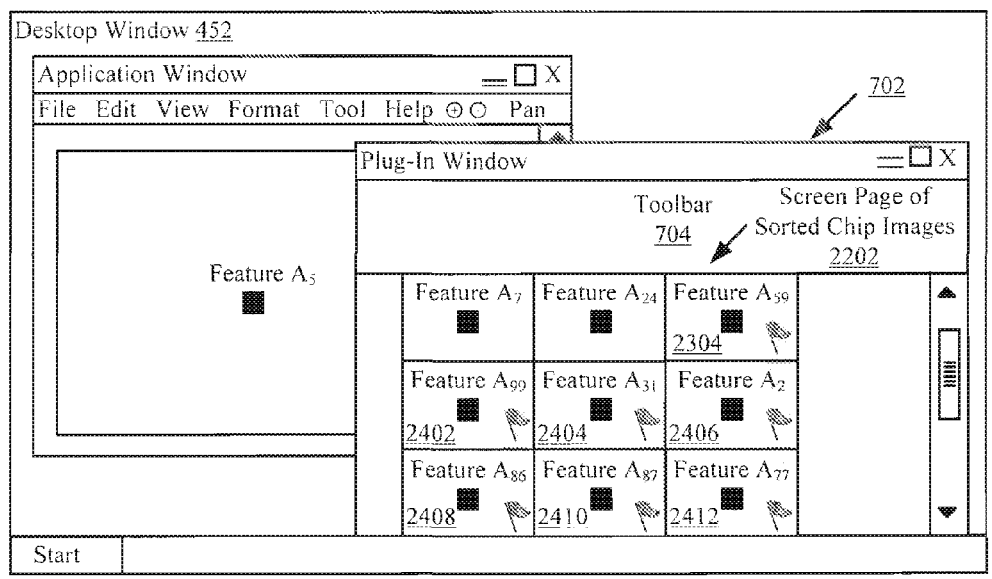
FIG. 24 is a schematic illustration of an exemplary screen page comprising a plurality of marked or annotated sorted chip images that is useful for understanding the present invention.

A schematic illustration of an exemplary selected chip image 2304 and an exemplary menu 2306 is provided in FIG. 23. As shown in FIG. 23, the selected chip image 2304 is annotated with a relatively thick and distinctly colored border. Also, the selected command "Flag/Unflag Forward" of the menu 2306 is annotated by bolding the text thereof. Embodiments of the present invention are not limited in this regard. Any type of mark or annotation can be used to illustrate that a particular chip image has been selected and/or that a particular command of a menu has been selected.

Upon completing step 2115 of FIG. 21B, step 2117 is performed. In step 2117, every unmarked chip image on the displayed screen page is automatically marked as "mixture" and validated. Step 2117 can also involve automatically marking every unmarked chip image located between screen pages marked as "mixture". In a next step 2119, a second screen page of sorted chip images is displayed in the plug-in window. The second screen page comprises a screen page which precedes or succeeds the first screen page by a certain amount. Thereafter, step 2121 is performed where the method 2100 ends or other processing is performed.

Figure 25:
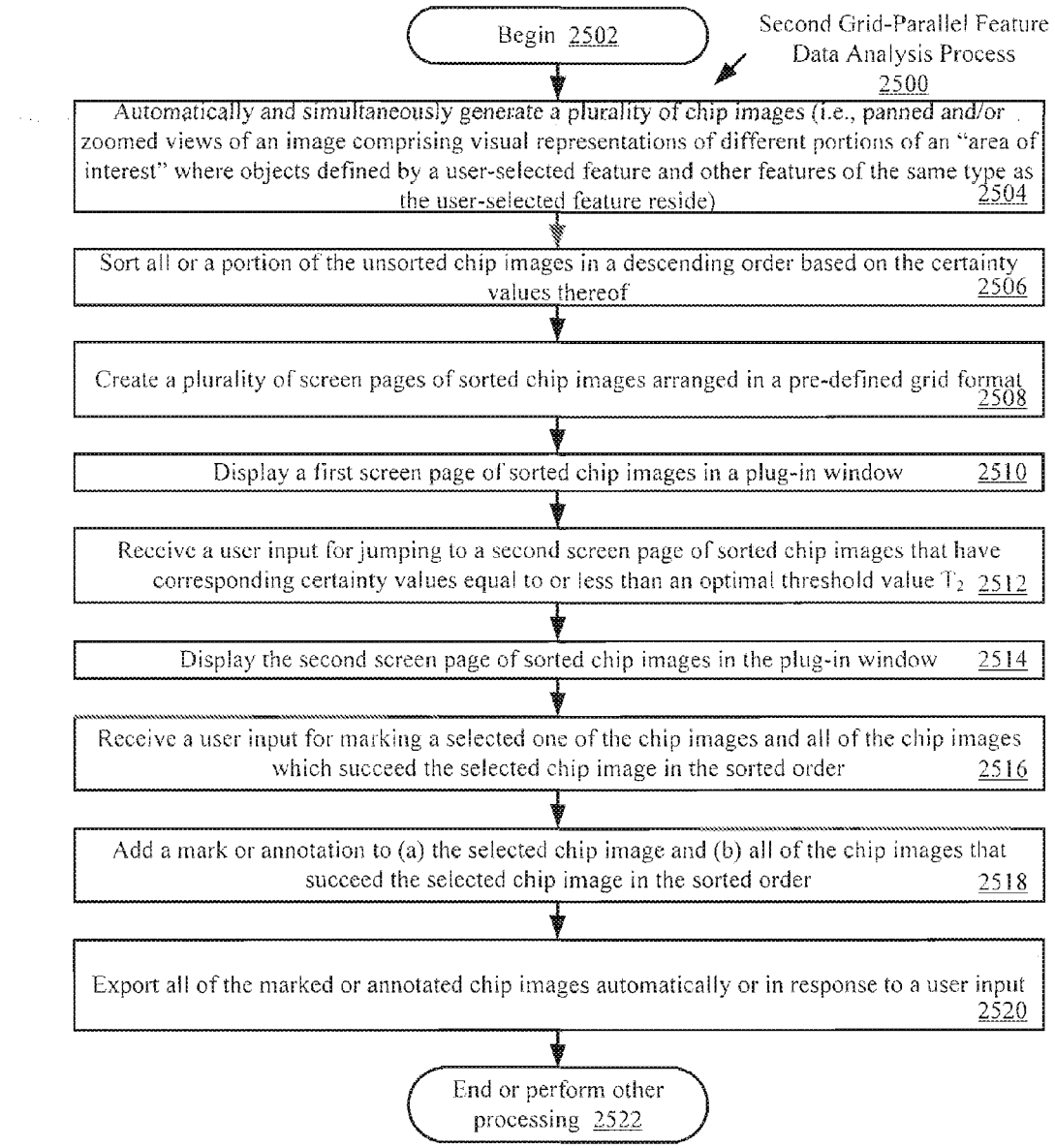
FIG. 25 is a flow diagram of an exemplary second grid-parallel feature data analysis process that is useful for understanding the present invention.
Figure 26:
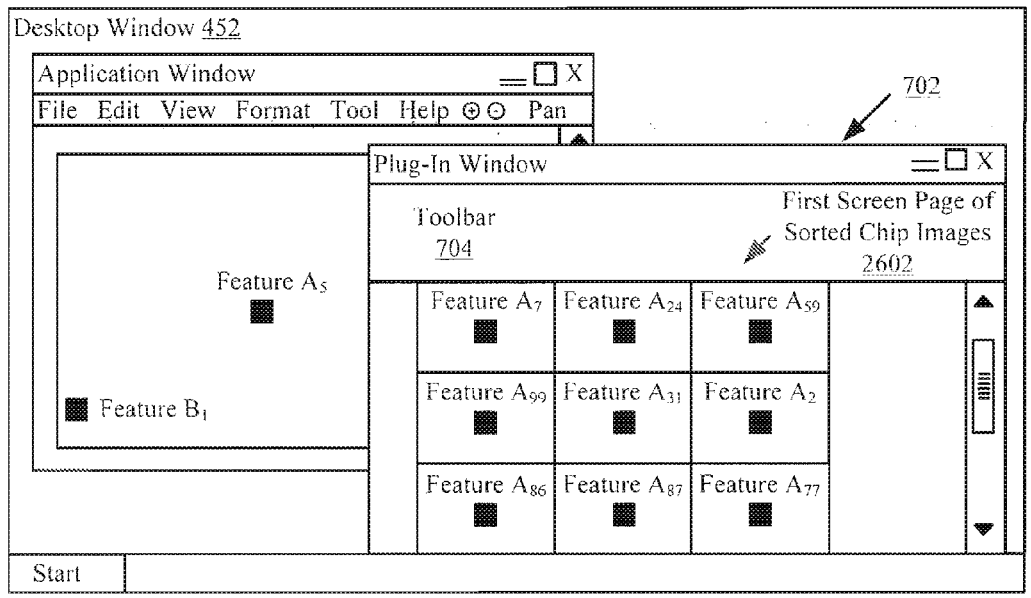
FIG. 26 is a schematic illustration of an exemplary first screen page of sorted chip images that is useful for understanding the present invention.
Figure 27:
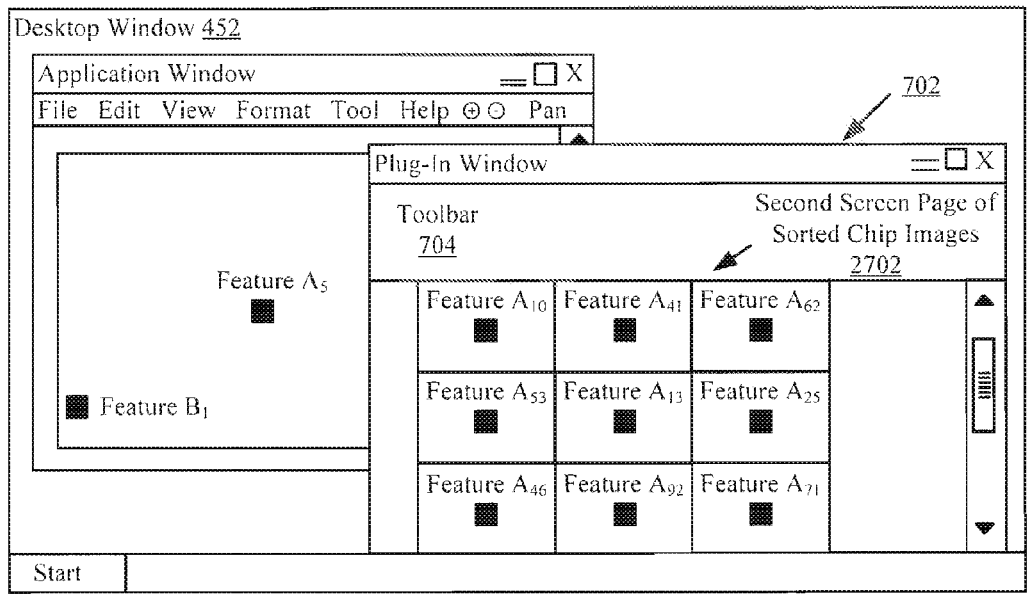
FIG. 27 is a schematic illustration of an exemplary second screen page of sorted chip image that is useful for understanding the present invention.

Referring now to FIG. 25, there is provided a flow diagram of an exemplary second grid-parallel feature data analysis process 2500 that is useful for understanding the present invention. As shown in FIG. 25, process 2500 begins with step 2502 and continues with step 2504. Step 2504 involves automatically and simultaneously generating a plurality of chip images. The chip images are panned and/or zoomed views of an image comprising visual representations of different portions of an "area of interest" where objects defined by a user-selected feature and other detected features of the same type as the user-selected feature reside.

In a next step 2506, the chip images are sorted in a descending order based on the certainty values associated with the features thereof. The sorting operations of step 2506 are performed by the feature analysis plug-in automatically or in response to a user input. The user input is facilitated by a GUI widget (e.g., GUI widget 814 of FIG. 8A) of the plug-in window (e.g., the plug-in window 702 of FIG. 7). The GUI widget may be configured to allow a user to specify the attribute (e.g., certainty value) that the sorting should be based on, and/or specify whether the chip images should be sorted in a descending order.

Upon completing step 2506, step 2508 is performed where a plurality of screen pages of sorted chip images is created by the feature analysis plug-in. The sorted chip images are arranged on each screen page in a pre-defined grid format or a matrix format. A first screen page of sorted chip images is then displayed in the plug-in window, as shown by step 2510. A schematic illustration of an exemplary first screen page of sorted chip images 2602 is provided in FIG. 26.

After the first screen page of chip images has been displayed, a user input is received by the computing device for viewing a second screen page of sorted chip images in the plug-in window. The second screen page comprises chip images that have corresponding certainty values equal to or less than an optimal threshold value $T_2$. The user input is facilitated by a GUI widget (e.g., GUI widget 806 of FIG. 8A) of the plug-in window (e.g., the plug-in window 702 of FIG. 7). The GUI widget may be configured to facilitate jumping to a desired screen page of sorted chip images for review. In this regard, the GUI widget includes a text box for entering a screen page number and a search button for causing the screen page of sorted chip images having the entered screen page number to be displayed in the display area (e.g., display area 706 of FIG. 7) of the plug-in window (e.g., plug-in window 702 of FIG. 7). The GUI widget may also include a means for jumping to a screen page comprising chip images with corresponding certainty values equal to or less than the optimal threshold value $T_2$. Such means may include, but is not limited to, a text box and a button.

After the user input is received in step 2512, the process 2500 continues with step 2514. Step 2514 involves displaying the second screen page of sorted chip images in the plug-in window. A schematic illustration of an exemplary second screen page of sorted chip images 2702 displayed in the plug-in window 702 is provided in FIG. 27.

In a next step 2516, the computing device receives a user input for marking a selected one of the displayed chip images and all of the chip images which succeed the selected chip image in the sorted order. Notably, the selected chip image and the succeeding chip images comprise false positives. Also, one of the displayed chip images which precedes the selected displayed chip image does not comprise a false positive. As noted above, the phrase "false positive" refers to features that were erroneously identified as being a feature of the same feature class as the user-selected feature. The chip image is selected by moving a mouse cursor over the chip image and clicking a mouse button. In response to the click of the mouse button, a menu is presented to the user of the computing device. The menu includes a list of commands, such as a command for enabling "Flag/Unflag Forward" operations.

Figure 28:
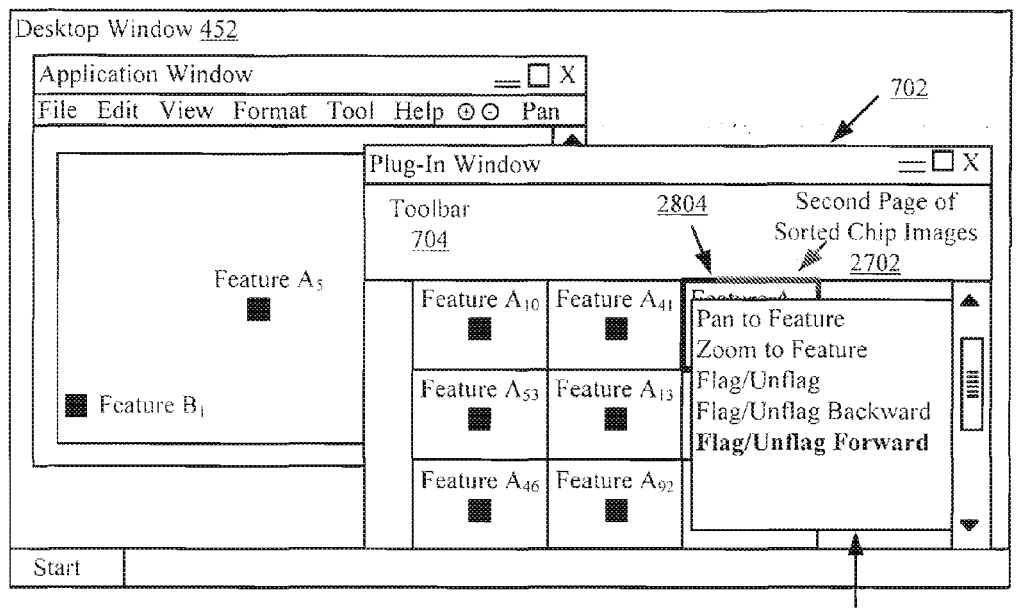
FIG. 28 is a schematic illustration of an exemplary selected chip image and menu of commands that is useful for understanding the present invention.
Figure 29:
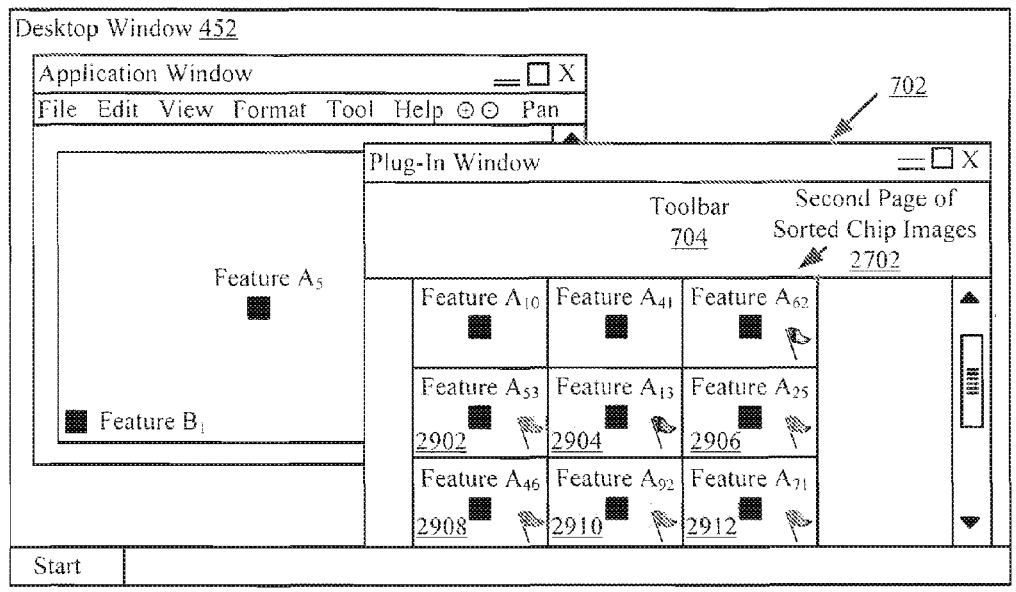
FIG. 29 is a schematic illustration of a plurality of "flagged forward" chip images that is useful for understanding the present invention.

A schematic illustration of an exemplary selected chip image 2804 and an exemplary menu 2802 is provided in FIG. 28. As shown in FIG. 28, the selected chip image 2804 is annotated with a relatively thick and distinctly colored border. Also, the selected command "Flag/Unflag Forward" of the menu 2802 is annotated by bolding the text thereof. Embodiments of the present invention are not limited in this regard. Any type of mark or annotation can be used to illustrate that a particular chip image has been selected and/or that a particular command of a menu has been selected.

Referring again to FIG. 25, the process 2500 continues with step 2518. In step 2518, the feature analysis plug-in performs operations to add a mark or annotation to the selected chip image (e.g., chip image 2804 of FIG. 28) and to all of the chip images which succeed the selected chip image in a sorted order (e.g., chip images 2902-2912 of FIG. 29). Upon completing step 2518, step 2520 is performed where all of the marked or annotated chip images are exported to a table or file. The exportation can be initiated by a user of the computing device using a GUI widget (e.g., GUI widget 816 or 818 of FIG. 8A) of the plug-in window. In a next step 2522, process 2500 ends or other processing is performed.

In view of the forgoing, the present invention supports improved automation of feature extraction. In this regard, the present invention permits use of imperfect feature extraction algorithms to achieve high accuracy and high quality results. The feature extraction algorithms include, but are not limited to, edge detection based algorithms, corner detection based algorithms, blob detection based algorithms, ridge detection based algorithms, and Hough transform based algorithms. Each of the listed feature extraction algorithms are well known in the art, and therefore will not be described in detail herein. The high quality results are generated using efficient validation processes (e.g., the clustered feature data analysis process of FIGS. 10-16, the grid-parallel feature data analysis process of FIGS. 17-20, the convergent grid-parallel feature data analysis process of FIGS. 21-24, and the grid-parallel feature data analysis process of FIGS. 25-29). Each of the validation processes reduces the cost of analyzing feature data as compared to that of conventional feature data analysis techniques (such as that described in the background section of this document).

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for efficient feature data analysis, comprising:
determining, by at least one electronic circuit, a first number of screen pages needed to verify that each of a plurality of clusters of detected features comprises only detected features which were correctly identified during feature extraction/detection operations as being of the same feature class as a selected feature of an image, said first number of screen pages equal to a total number of the clusters;
determining, by the electronic circuit, a second number of screen pages needed to verify that each of a plurality of singular detected features was correctly identified during feature extraction/detection operations as being of the same feature class as the selected feature of the image, said second number of screen pages equal to a reference number resulting from dividing a total number of detected features by a parallelization factor;
selecting, by the electronic circuit, one of a plurality of different validation processes based on a result of comparing a value of the first number of screen pages to a value of the second number of screen pages; and
performing the selected one of the plurality of validation processes to verify that each of the detected features was correctly identified during the feature extraction/detection operations as being of the same feature class as the selected feature of the image.

2. The method according to claim 1, wherein the first and second number of screen pages are exclusively determined when spatial data for the detected features exists.

3. The method according to claim 1, wherein the selecting comprises determining if a total number of clusters of detected features is less than a reference number.

4. A method for efficient feature data analysis, comprising:
determining, by at least one electronic circuit, a first number of screen pages needed to verify that each of a plurality of clusters of detected features comprises only detected features which were correctly identified during feature extraction/detection operations as being of the same feature class as a selected feature of an image;
determining, by the electronic circuit, a second number of screen pages needed to verify that each of a plurality of singular detected features was correctly identified during feature extraction/detection operations as being of the same feature class as the selected feature of the image;
selecting, by the electronic circuit, one of a plurality of different validation processes based on values of the first number of screen pages and the second number of screen pages; and
performing the selected one of the plurality of validation processes to verify that each of the detected features was correctly identified during the feature extraction/detection operations as being of the same feature class as the selected feature of the image;
wherein the selecting comprises determining if a total number of clusters of detected features is less than a reference number, where the reference number comprises a result of dividing a total number of detected features by a parallelization factor.

5. A method for efficient feature data analysis, comprising:
determining, by at least one electronic circuit a first number of screen pages needed to verify that each of a plurality of clusters of detected features comprises only detected features which were correctly identified during feature extraction/detection operations as being of the same feature class as a selected feature of an image;
determining, by the electronic circuit, a second number of screen pages needed to verify that each of a plurality of singular detected features was correctly identified during feature extraction/detection operations as being of the same feature class as the selected feature of the image;
selecting, by the electronic circuit, one of a plurality of different validation processes based on values of the first number of screen pages and the second number of screen pages; and
performing the selected one of the plurality of validation processes to verify that each of the detected features was correctly identified during the feature extraction/detection operations as being of the same feature class as the selected feature of the image;
wherein the selecting comprises determining if a total number of clusters of detected features is less than a reference number, where the reference number comprises a log base two of a total number of detected features divided by a parallelization factor.

6. A method for efficient feature data analysis, comprising:

determining by at least one electronic circuit a first number of screen pages needed to verify that each of a plurality of clusters of detected features comprises only detected features which were correctly identified during feature extraction/detection operations as being of the same feature class as a selected feature of an image;

determining, by the electronic circuit, a second number of screen pages needed to verify that each of a plurality of singular detected features was correctly identified during feature extraction/detection operations as being of the same feature class as the selected feature of the image;

selecting, by the electronic circuit, one of a plurality of different validation processes based on values of the first number of screen pages and the second number of screen pages;

performing the selected one of the plurality of validation processes to verify that each of the detected features was correctly identified during the feature extraction/detection operations as being of the same feature class as the selected feature of the image;

determining if a total number of clusters of detected features is less than a reference number; and analyzing at least one cluster screen page when the total number of clusters of detected features is less than the reference number, the cluster screen page comprising a chip image including one of the plurality of clusters of detected features.

7. The method according to claim 6, further comprising adding a mark or annotation to the chip image indicating that the chip image comprises at least one detected feature which was incorrectly identified during the feature extraction/detection operations as being of the same feature class as the selected feature of the image.

8. The method according to claim 6, further comprising adding a mark or annotation adjacent to at least one detected feature of the chip image indicating that the detected feature was incorrectly identified during the feature extraction/detection operations as being of the same feature class as the selected feature of the image.

9. A method for efficient feature data analysis, comprising:

determining, by at least one electronic circuit, a first number of screen pages needed to verify that each of a plurality of clusters of detected features comprises only detected features which were correctly identified during feature extraction/detection operations as being of the same feature class as a selected feature of an image;

determining, by the electronic circuit, a second number of screen pages needed to verify that each of a plurality of singular detected features was correctly identified during feature extraction/detection operations as being of the same feature class as the selected feature of the image;

selecting, by the electronic circuit, one of a plurality of different validation processes based on values of the first number of screen pages and the second number of screen pages;

performing the selected one of the plurality of validation processes to verify that each of the detected features was correctly identified during the feature extraction/detection operations as being of the same feature class as the selected feature of the image;

determining if a total number of clusters of detected features is less than a reference number; and analyzing at least one features screen page when the total number of clusters of detected features is equal to or greater than the reference number, the features screen page comprising a plurality of chip images arranged in a grid format, each of the chip images including one of the detected features.

10. The method according to claim 9, further comprising adding a mark or annotation to at least one of the plurality of chip images indicating that it comprises a detected feature which was incorrectly identified during the feature extraction/detection operations as being of the same feature class as the selected feature of the image.

11. The method according to claim 9, further comprising sorting the plurality of chip images based on at least one feature detection metric.

12. The method according to claim 11, further comprising identifying one of a plurality of features screen pages that comprises chip images containing detected features with feature detection metrics bracketing a given threshold value.

13. A system, comprising:

at least one electronic circuit configured to:

determine a first number of screen pages needed to verify that each of a plurality of clusters of detected features comprises only detected features which were correctly identified during feature extraction/detection operations as being of the same feature class as a selected feature of an image, the first number of screen pages equal to a total number of the clusters;

determine a second number of screen pages needed to verify that each of a plurality of singular detected features was correctly identified during feature extraction/detection operations as being of the same feature class as the selected feature of the image, the second number of screen pages equal to a reference number resulting from dividing a total number of detected features by a parallelization factor, select one of a plurality of different validation processes based on a result of comparing a value of the first number of screen pages to a value of the second number of screen pages, and perform the selected one of the plurality of validation processes to verify that each of the detected features was correctly identified during the feature extraction/detection operations as being of the same feature class as the selected feature of the image.

14. The system according to claim 13, wherein the first and second number of screen pages are exclusively determined when spatial data for the detected features exists.

15. The system according to claim 13, wherein the electronic circuit is further configured to determine if a total number of clusters of detected features is less than a reference number.

16. A system, comprising:

at least one electronic circuit configured to:

determine a first number of screen pages needed to verify that each of a plurality of clusters of detected features comprises only detected features which were correctly identified during feature extraction/detection operations as being of the same feature class as a selected feature of an image;

determine a second number of screen pages needed to verify that each of a plurality of singular detected features was correctly identified during feature extraction/detection operations as being of the same feature class as the selected feature of the image, select one of a plurality of different validation processes based on values of the first number of screen pages and the second number of screen pages, perform the selected one of the plurality of validation processes to verify that each of the detected features was correctly identified during the feature extraction/detection operations as being of the same feature class as the selected feature of the image; and determine if a total number of clusters of detected features is less than a reference number, where the reference number comprises a result of dividing a total number of detected features by a parallelization factor.

17. A system, comprising:

at least one electronic circuit configured to:

determine a first number of screen pages needed to verify that each of a plurality of clusters of detected features comprises only detected features which were correctly identified during feature extraction/detection operations as being of the same feature class as a selected feature of an image;

determine a second number of screen pages needed to verify that each of a plurality of singular detected features was correctly identified during feature extraction/detection operations as being of the same feature class as the selected feature of the image, select one of a plurality of different validation processes based on values of the first number of screen pages and the second number of screen pages, and perform the selected one of the plurality of validation processes to verify that each of the detected features was correctly identified during the feature extraction/detection operations as being of the same feature class as the selected feature of the image; and determine if a total number of clusters of detected features is less than a reference number, where the reference number comprises a log base two of a total number of detected features divided by a parallelization factor.

18. A system, comprising:

at least one electronic circuit configured to:

determine a first number of screen pages needed to verify that each of a plurality of clusters of detected features comprises only detected features which were correctly identified during feature extraction/detection operations as being of the same feature class as a selected feature of an image;

determine a second number of screen pages needed to verify that each of a plurality of singular detected features was correctly identified during feature extraction/detection operations as being of the same feature class as the selected feature of the image, select one of a plurality of different validation processes based on values of the first number of screen pages and the second number of screen pages, and perform the selected one of the plurality of validation processes to verify that each of the detected features was correctly identified during the feature extraction/detection operations as being of the same feature class as the selected feature of the image;

determine if a total number of clusters of detected features is less than a reference number; and analyze at least one cluster screen page when the total number of clusters of detected features is less than the reference number, the cluster screen page comprising a chip image including one of the plurality of clusters of detected features.

19. The system according to claim 18, wherein the electronic circuit is further configured to add a mark or annotation to the chip image indicating that the chip image comprises at least one detected feature which was incorrectly identified during the feature extraction/detection operations as being of the same feature class as the selected feature of the image.

20. The system according to claim 18, wherein the electronic circuit is further configured to add a mark or annotation adjacent to at least one detected feature of the chip image indicating that the detected feature was incorrectly identified during the feature extraction/detection operations as being of the same feature class as the selected feature of the image.

21. A system, comprising:

at least one electronic circuit configured to:

determine a first number of screen pages needed to verify that each of a plurality of clusters of detected features comprises only detected features which were correctly identified during feature extraction/detection operations as being of the same feature class as a selected feature of an image;

determine a second number of screen pages needed to verify that each of a plurality of singular detected features was correctly identified during feature extraction/detection operations as being of the same feature class as the selected feature of the image, select one of a plurality of different validation processes based on values of the first number of screen pages and the second number of screen pages, and perform the selected one of the plurality of validation processes to verify that each of the detected features was correctly identified during the feature extraction/detection operations as being of the same feature class as the selected feature of the image;

determine if a total number of clusters of detected features is less than a reference number; and analyze at least one features screen page when the total number of clusters of detected features is equal to or greater than the reference number, the features screen page comprising a plurality of chip images arranged in a grid format, each of the chip images including one of the detected features.

22. The system according to claim 21, wherein the electronic circuit is further configured to add a mark or annotation to at least one of the plurality of chip images indicating that it comprises a detected feature which was incorrectly identified during the feature extraction/detection operations as being of the same feature class as the selected feature of the image.

23. The system according to claim 21, wherein the electronic circuit is further configured to sort the plurality of chip images based on at least one feature detection metric.

24. The system according to claim 23, wherein the electronic circuit is further configured to identify one of a plurality of features screen pages that comprises chip images containing detected features with feature detection metrics bracketing a given threshold value.

* * * * *